(12) United States Patent
Shirasaki et al.

(10) Patent No.: US 6,169,630 B1
(45) Date of Patent: Jan. 2, 2001

(54) VIRTUALLY IMAGED PHASED ARRAY (VIPA) HAVING LENSES ARRANGED TO PROVIDE A WIDE BEAM WIDTH

(75) Inventors: Masataka Shirasaki, Winchester, MA (US); Simon Cao, San Mateo, CA (US)

(73) Assignees: Fujitsu Limited, Kawasaki (JP); Avanex Corporation, Fremont, CA (US)

( * ) Notice: Under 35 U.S.C. 154(b), the term of this patent shall be extended for 0 days.

(21) Appl. No.: 09/140,639

(22) Filed: Aug. 26, 1998

Related U.S. Application Data

(63) Continuation-in-part of application No. 08/685,362, filed on Jul. 24, 1996, now Pat. No. 5,999,320, and a continuation-in-part of application No. 08/796,842, filed on Feb. 7, 1997, now Pat. No. 5,930,045.

(30) Foreign Application Priority Data

Jul. 26, 1995 (JP) .................................................... 7-190535

(51) Int. Cl.⁷ .............................. G02B 27/00; G02B 5/04
(52) U.S. Cl. ........................... 359/577; 359/615; 359/629
(58) Field of Search .................................... 359/578, 577, 359/615, 629, 579; 356/352

(56) References Cited

U.S. PATENT DOCUMENTS

| | | | |
|---|---|---|---|
| 3,832,030 | 8/1974 | Gloge | 385/33 |
| 4,362,361 | 12/1982 | Campbell et al. | 359/629 |
| 4,655,547 | 4/1987 | Heritage et al. | 359/563 |
| 4,743,114 * | 5/1988 | Crane, Jr. | 356/346 |
| 4,820,019 | 4/1989 | Yoshida et al. | 359/578 |
| 5,202,939 * | 4/1993 | Belleville et al. | 356/345 |
| 5,309,456 | 5/1994 | Horton | 372/25 |
| 5,485,275 * | 1/1996 | Ohtsuka | 356/359 |
| 5,583,683 | 12/1996 | Scobey | 359/589 |
| 5,974,061 * | 10/1999 | Byren et al. | 372/29 |

FOREIGN PATENT DOCUMENTS

| | | | |
|---|---|---|---|
| 0026669 | 5/1930 | (AU) | 359/578 |
| 402163984A * | 6/1990 | (JP) . | |

OTHER PUBLICATIONS

M. Shirasaki, Large Angular–Dispersion By Virtually–Imaged Phased–Array (VIPA) and Its Application to Wavelength Demultiplexing, MOC '95, Hiroshima, Oct. 1995.

M. Shirasaki, Large Angular Dispersion by a Virtually–Imaged Phased Array and its Application to a Wavelength Demultimplexer, Optics Letters, vol. 21, No. 5, Mar. 1996.

M. Shirasaki, Temperature Independent Interferometer For WDM Filters, Paper WeD.1.6 ECOC '96 (European Conference on Optical Communication), Sep. 18, 1996.

(List continued on next page.)

Primary Examiner—Cassandra Spyrou
Assistant Examiner—John Juba, Jr.
(74) Attorney, Agent, or Firm—Staas & Halsey, LLP

(57) ABSTRACT

An angular dispersive device acts as a virtually imaged phased array (VIPA) which receives an input light, and produces a spatially distinguishable output light in accordance with the wavelength of the input light. First, second and third lenses are arranged in order to focus the input light into the angular dispersive device. The characteristics of the first, second and third lenses are determined to provide an increased beam width in a top view of the output light produced by the angular dispersive device. The first lens collimates the input light in a side view and has no lens effect in a top view. The second lens receives the input light from the first lens, and focuses the input light in the side view and has no lens effect in the top view. The third lens receives the input light from the second lens, and collimates the input light in the top view and has no lens effect in the side view. The angular dispersive device has first and second surfaces. The first and second lenses can be combined into a single lens.

85 Claims, 19 Drawing Sheets

OTHER PUBLICATIONS

M. Shirasaki, Filtering Characteristics of Virtually–Imaged Phased Array, Presented at IPR (Integrated Photonics Research) Topical Meeting Paper IMC3, Apr. 29, 1996, Boston, MA.

U.S. application No. 08/685,362, Shirasaki, filed Jul. 24, 1996.

U.S. application No. 08/796,842, Shirasaki, filed Feb. 07, 1997.

U.S. application No. 08/910,251, Shirasak, filed Aug. 13, 1997.

U.S. application No. 08/948,945, Shirasaki, filed Oct. 10, 1997.

* cited by examiner

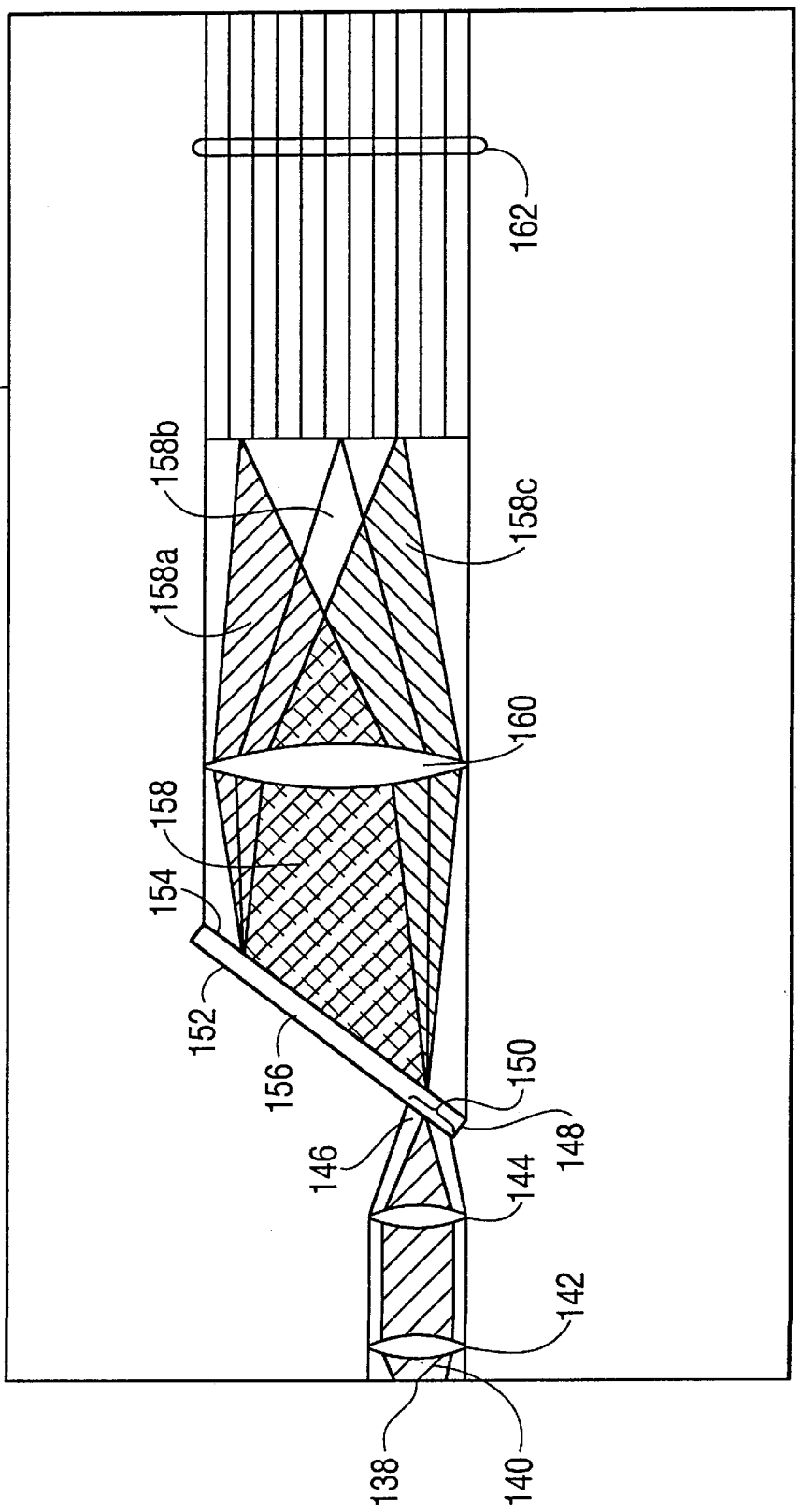

VIRTUALLY IMAGED PHASED ARRAY (VIPA) HAVING LENSES ARRANGED TO PROVIDE A WIDE BEAM WIDTH

CROSS-REFERENCE TO RELATED APPLICATIONS

This application is a continuation-in-part (CIP) of U.S. application Ser. No. 08/685,362, filed Jul. 24, 1996, titled "VIRTUALLY IMAGED PHASED ARRAY AS A WAVELENGTH DEMULTIPLEXER", now U.S. Pat. No. 5,999,320 and which is incorporated herein by reference.

This application is also a CIP of U.S. application Ser. No. 08/796,842, filed Feb. 7, 1997, titled "OPTICAL APPARATUS WHICH USES A VIRTUALLY IMAGED PHASED ARRAY TO PRODUCE CHROMATIC DISPERSION", now U.S. Pat. No. 5,930,045 and which is incorporated herein by reference.

This application is related to U.S. application Ser. No. 08/910,251, filed Aug. 13, 1997, titled "OPTICAL APPARATUS WHICH USES A VIRTUALLY IMAGED PHASED ARRAY TO PRODUCE CHROMATIC DISPERSION", now U.S. Pat. No. 5,969,865 and which is incorporated herein by reference.

This application is also related to U.S. application Ser. No. 08/948,945, filed Oct. 10, 1997, titled "APPARATUS WHICH INCLUDES A VIRTUALLY IMAGED PHASED ARRAY (VIPA) IN COMBINATION WITH A WAVELENGTH SPLITTER TO DEMULTIPLEX A WAVELENGTH DIVISION MULTIPLEXED (WDM) LIGHT", and now U.S. Pat. No. 5,973,838 which is incorporated herein by reference.

This application is based on, and claims priority to, Japanese patent application number 07-190535, filed Jul. 26, 1995, in Japan, and which is incorporated herein by reference.

BACKGROUND OF THE INVENTION

1. Field of the Invention

The present invention relates to a virtually imaged phased array (VIPA), or "wavelength splitter", which receives a wavelength division multiplexed light comprising a plurality of carriers, and splits the wavelength division multiplexed light into a plurality of luminous fluxes which correspond, respectively, to the plurality of carriers and are spatially distinguishable from each other.

2. Description of the Related Art

Wavelength division multiplexing is used in fiber optic communication systems to transfer a relatively large amount of data at a high speed. More specifically, a plurality of carriers, each modulated with information, is combined into a wavelength division multiplexed light. The wavelength division multiplexed light is then transmitted through a single optical fiber to a receiver. The receiver splits the wavelength division multiplexed light into the individual carriers, so that the individual carriers can be detected. In this manner, a communication system can transfer a relatively large amount of data over an optical fiber.

Therefore, the ability of the receiver to accurately split the wavelength division multiplexed light will greatly effect the performance of the communication system. For example, even if a large number of carriers can be combined into a wavelength division multiplexed light, such a wavelength division multiplexed light should not be transmitted if the receiver cannot accurately split the wavelength division multiplexed light. Accordingly, it is desirable for a receiver to include a high-precision wavelength splitter.

FIG. 1 is a diagram illustrating a conventional filter using a multiple-layer interference film, for use as a wavelength splitter. Referring now to FIG. 1, a multiple-layer interference film 20 is formed on a transparent substrate 22. Light 24, which must be parallel light, is incident on film 20 and then repeatedly reflected in film 20. Optical conditions determined by the characteristics of film 20 allow only a light 26 having wavelength $\lambda 2$ to pass therethrough. A light 28, which includes all light not meeting the optical conditions, does not pass through the film 20 and is reflected. Thus, a filter as illustrated in FIG. 1 is useful for splitting a wavelength division multiplexed light which includes only two carriers at different wavelengths, $\lambda 1$ and $\lambda 2$. Unfortunately, such a filter, by itself, cannot separate a wavelength division multiplexed light having more than two carriers.

FIG. 2 is a diagram illustrating a conventional Fabry-Perot interferometer for use as a wavelength splitter. Referring now to FIG. 2, high-reflectance reflecting films 30 and 32 are parallel to each other. Light 34, which must be parallel light, is incident on reflecting film 30 and reflected many times between reflecting films 30 and 32. Light 36 of wavelength $\lambda 2$ that meets passage conditions determined by the characteristics of the Fabry-Perot interferometer passes through reflecting film 32. Light 38 of wavelength $\lambda 1$, which does not meet the passage conditions, is reflected. In this manner, light having two different wavelengths can be split into two different lights corresponding, respectively, to the two different wavelengths. Thus, as with the filter illustrated in FIG. 1, a conventional Fabry-Perot interferometer is useful for splitting a wavelength division multiplexed light which includes only two carriers at different wavelengths, $\lambda 1$ and $\lambda 2$. Unfortunately, such a Fabry-Perot interferometer cannot separate a wavelength division multiplexed light having more than two carriers.

FIG. 3 is a diagram illustrating a conventional Michelson interferometer for use as a wavelength splitter. Referring now to FIG. 3, parallel light 40 is incident on a half mirror 42 and split into a first light 44 and a second light 46 perpendicular to each other. A reflecting mirror 48 reflects first light 44 and a reflecting mirror 50 reflects second light 46. The distance between half mirror 42 and reflecting mirror 48, and the distance between half mirror 42 and reflecting mirror 50 indicate an optical path difference. Light reflected by reflecting mirror 48 is returned to half mirror 42 and interferes with light reflected by reflecting mirror 50 and returned to half mirror 42. As a result, lights 52 and 54 having wavelengths $\lambda 1$ and $\lambda 2$, respectively, are separated from each other. As with the filter illustrated in FIG. 1 and the Fabry-Perot interferometer illustrated in FIG. 2, the Michelson interferometer illustrated in FIG. 3 is useful for splitting a wavelength division multiplexed light which includes only two carriers at different wavelengths, $\lambda 1$ and $\lambda 2$. Unfortunately, such a Michelson interferometer cannot separate a wavelength division multiplexed light having more than two carriers.

It is possible to combine several filters, Fabry-Perot interferometers or Michelson interferometers into a giant array so that additional wavelength carriers can be split from a single wavelength division multiplexed light. However, such an array is expensive, inefficient and creates an undesireably large receiver.

A diffraction grating or an array waveguide grating is often used to split a wavelength division multiplexed light comprising two or more different wavelength carriers.

FIG. 4 is a diagram illustrating a conventional diffraction grating for splitting a wavelength division multiplexed light.

Referring now to FIG. 4, a diffraction grating 56 has a concavo-convex surface 58. Parallel light 60 having a plurality of different wavelength carriers is incident on concavo-convex surface 58. Each wavelength carrier is reflected and interferes among the reflected lights from different steps of the grating. As a result, carriers 62, 64 and 66 having different wavelengths are output from diffraction grating 56 at different angles, and are therefore separated from each other.

Unfortunately, a diffraction grating outputs the different wavelength carriers with relatively small difference of angle. Therefore, the angular dispersion produced by the diffraction grating will be extremely small. As a result, it is difficult for a receiver to accurately receive the various carrier signals split by the diffraction grating. This problem is especially severe with a diffraction grating which splits a wavelength division multiplexed light having a large number of carriers with relatively close wavelengths.

In addition, a diffraction grating is influenced by the optical polarization of the incident light. Therefore, the polarization of the incident light can affect the performance of the diffraction grating. Also, the concavo-convex surface of a diffraction grating requires complex manufacturing processes to produce an accurate diffraction grating.

FIG. 5 is a diagram illustrating a conventional array waveguide grating for splitting a wavelength division multiplexed light. Referring now to FIG. 5, light comprising a plurality of different wavelength carriers is received through an entrance 68 and is divided through a number of waveguides 70. An optical exit 72 is at the end of each waveguide 70, so that an output light 74 is produced. Waveguides 70 are different in length from each other, and therefore provide optical paths of different lengths. Therefore, lights passing through waveguides 70 have different path lengths from each other and thereby interfere with each other through exit 72 to form output 74 in different directions for different wavelengths.

In an array waveguide grating, the angular dispersion can be adjusted to some extent by properly configuring the waveguides. However, an array waveguide grating is influenced by temperature changes and other environmental factors. Therefore, temperature changes and environmental factors make it difficult to properly adjust the performance.

SUMMARY OF THE INVENTION

Accordingly, it is an object of the present invention to provide a wavelength splitter having a simple configuration and being capable of simultaneously separating a plurality of carriers from a wavelength division multiplexed light.

It is an additional object of the present invention to provide a wavelength splitter which disperses separated carriers at a relatively large angular dispersion, and is resistant to changes in environmental conditions.

Objects of the present invention are achieved by providing an apparatus having a side view and a top view and receiving an input light at a respective wavelength within a continuous range of wavelengths. The apparatus includes first, second and third lenses, and an angular dispersive device. The first lens collimates the input light in the side view and has no lens effect in the top view. The second lens receives the input light from the first lens, and focuses the input light in the side view and has no lens effect in the top view. The third lens receives the input light from the second lens, and collimates the input light in the top view and has no lens effect in the side view. The angular dispersive device has first and second surfaces. The second surface has a reflectivity which causes a portion of light incident thereon to be transmitted therethrough. The angular dispersive device receives the input light from the third lens. The first and second surfaces are positioned so that the input light is reflected a plurality of times between the first and second surfaces to cause a plurality of lights to be transmitted through the second surface. The plurality of transmitted lights interfere with each other to produce an output light which is spatially distinguishable from an output light produced for an input light having any other wavelength within the continuous range of wavelengths.

Objects of the present invention are further achieved by providing an apparatus having a side view and a top view and receiving an input light at a respective wavelength within a continuous range of wavelengths, wherein the apparatus includes first and second lenses, and an angular dispersive device. The first lens receives the input light, and acts as a lens in the side view and has no lens effect in the top view. The second lens receives the input light from the first lens, and acts as a lens in the top view and has no lens effect in the side view. The angular dispersive device has first and second surfaces. The second surface has a reflectivity which causes a portion of light incident thereon to be transmitted therethrough. The angular dispersive device receives the input light from the second lens. The first and second surfaces are positioned so that the input light is reflected a plurality of times between the first and second surfaces to cause a plurality of lights to be transmitted through the second surface. The plurality of transmitted lights interfere with each other to produce an output light which is spatially distinguishable from an output light produced for an input light having any other wavelength within the continuous range of wavelengths.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 13 is a diagram illustrating a waveguide type VIPA, according to an embodiment of the present invention.

DESCRIPTION OF THE PREFERRED EMBODIMENTS

Figure 1:
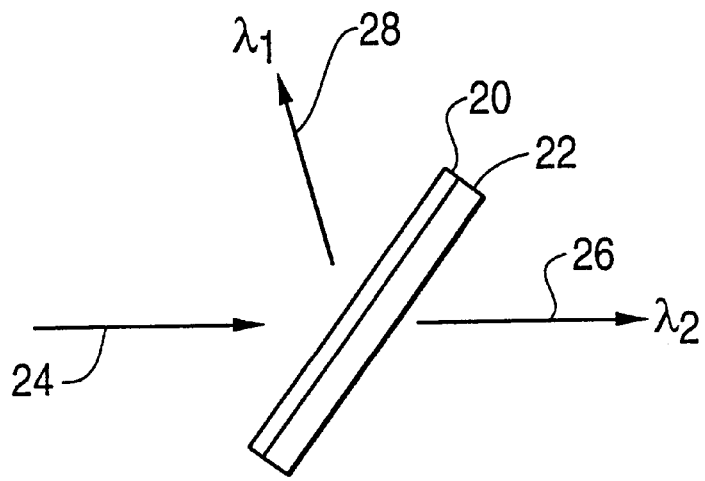
FIG. 1 (prior art) is a diagram illustrating a conventional filter using a multiple-layer interference film.
Figure 2:
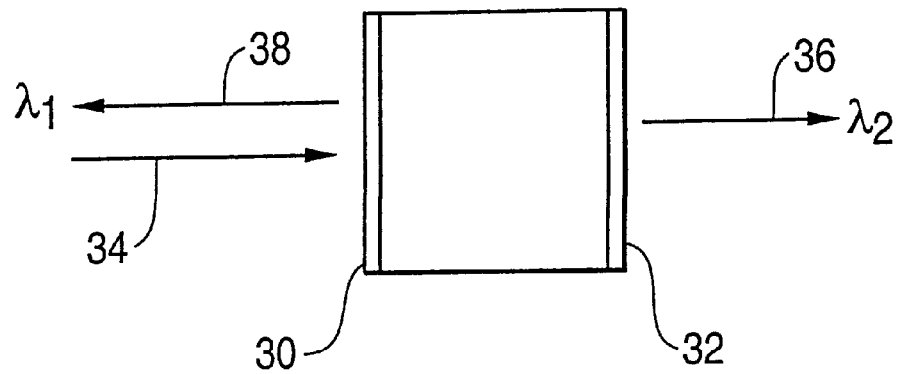
FIG. 2 (prior art) is a diagram illustrating a conventional Fabry-Perot interferometer.
Figure 3:
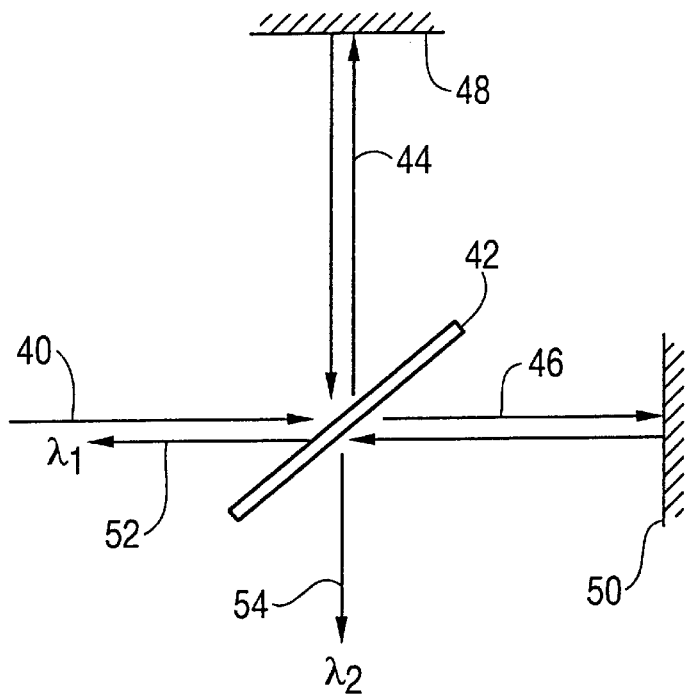
FIG. 3 (prior art) is a diagram illustrating a conventional Michelson interferometer.
Figure 4:
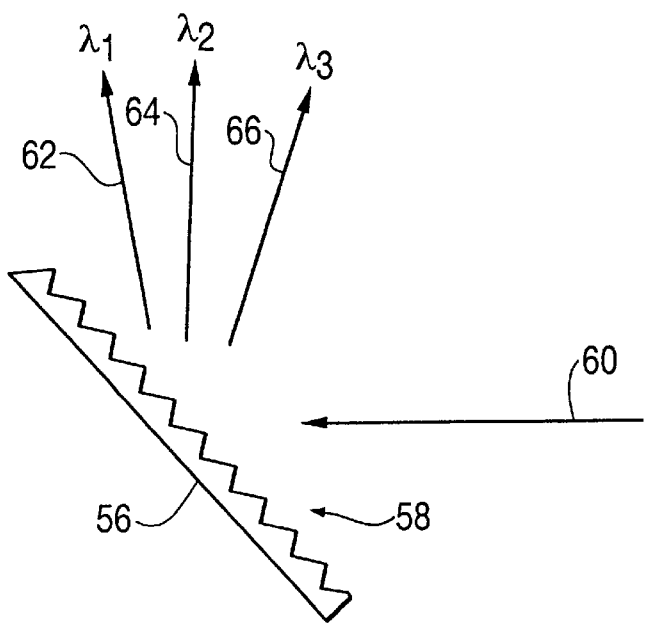
FIG. 4 (prior art) is a diagram illustrating a conventional diffraction grating.
Figure 5:
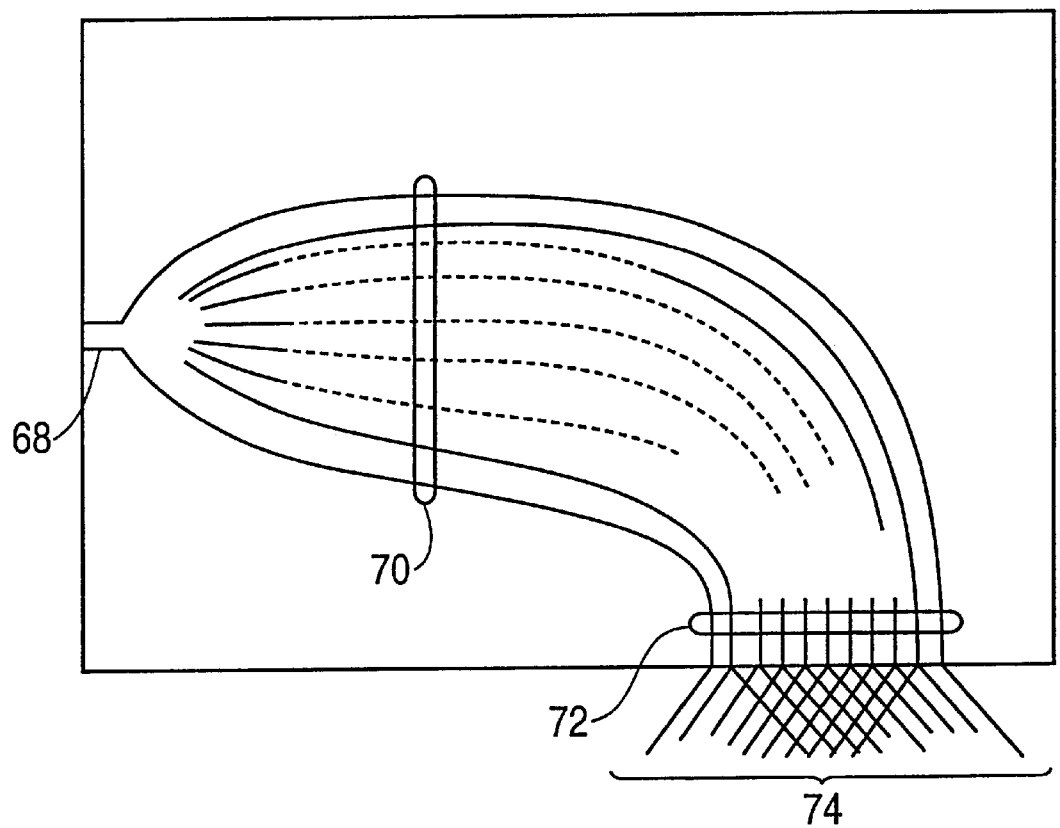
FIG. 5 (prior art) is a diagram illustrating a conventional array waveguide grating for splitting a wavelength division multiplexed light.

Reference will now be made in detail to the present preferred embodiments of the present invention, examples of which are illustrated in the accompanying drawings, wherein like reference numerals refer to like elements throughout.

Figure 6:
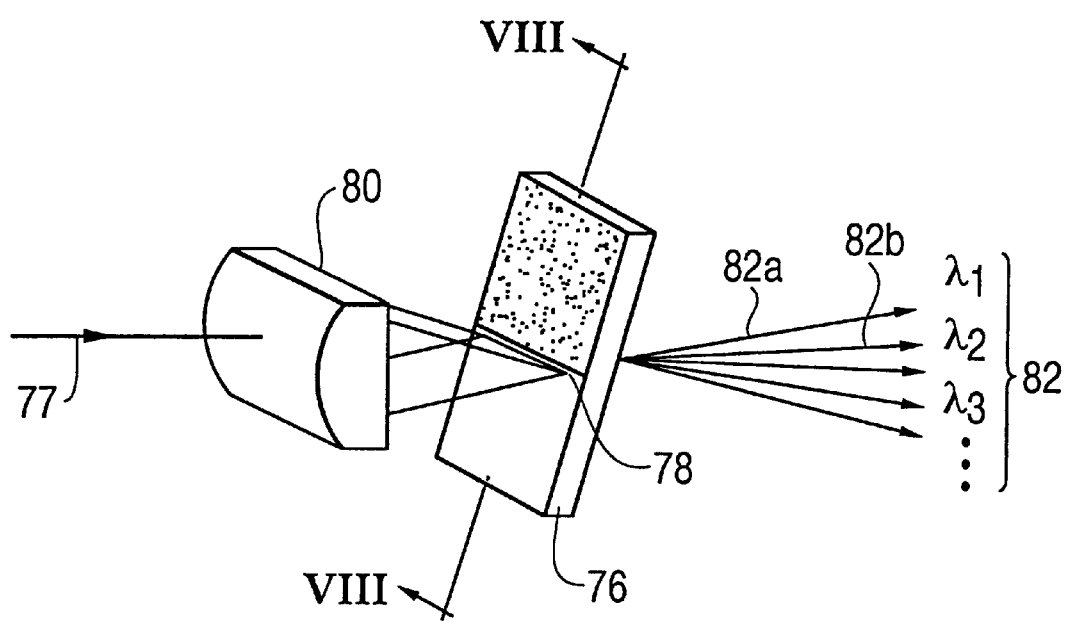
FIG. 6 is a diagram illustrating a virtually imaged phased array (VIPA), according to an embodiment of the present invention.

FIG. 6 is a diagram illustrating a virtually imaged phased array (VIPA), according to an embodiment of the present invention. Moreover, hereinafter, the terms "wavelength splitter", "virtually imaged phased array" and "VIPA" can be used interchangeably to describe various embodiments of the present invention.

Referring now to FIG. 6, a VIPA 76 is preferably made of a thin plate of glass. An input light 77 is focused into a line 78 with a lens 80, such as a semi-cylindrical lens, so that input light 77 travels into VIPA 76. Line 78 is hereinafter referred to as "focal line 78". Input light 77 radially propagates from focal line 78 inside VIPA 76. VIPA 76 then outputs a luminous flux 82 of collimated light, where the output angle of luminous flux 82 varies as the wavelength of input light 77 changes. For example, when input light 77 is at a wavelength λ1, VIPA 76 outputs a luminous flux 82a at wavelength λ1 in a specific direction. When input light 77 is at a wavelength λ2, VIPA 76 outputs a luminous flux 82b at wavelength λ2 in a different direction. Therefore, VIPA 76 produces luminous fluxes 82a and 82b which are spatially distinguishable from each other. If input light 77 includes both wavelengths λ1 and λ2, then VIPA 76 will simultaneously output both luminous fluxes 82a and 82b.

Figure 7:
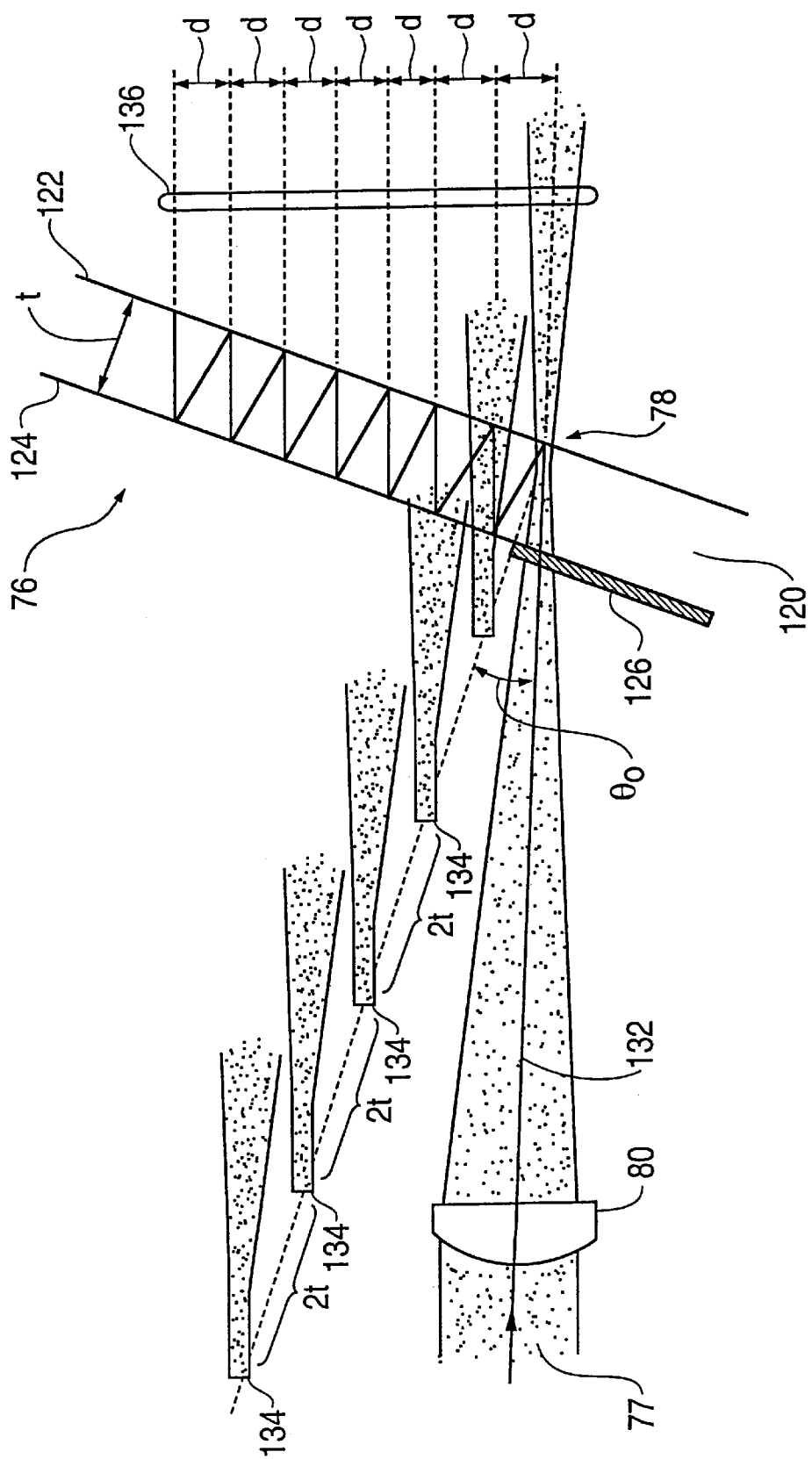
FIG. 7 is a detailed diagram illustrating the VIPA of FIG. 6, according to an embodiment of the present invention.

FIG. 7 is a detailed diagram illustrating VIPA 76, according to an embodiment of the present invention. Referring now to FIG. 7, VIPA 76 includes a plate 120 made of, for example, glass, and having reflecting films 122 and 124 thereon. Reflecting film 122 preferably has a reflectance of approximately 95% or higher, but less than 100%. Reflecting film 124 preferably has a reflectance of approximately 100%. A radiation window 126 is formed on plate 120 and preferably has a reflectance of approximately 0%.

Input light 77 is focused into focal line 78 by lens 80 through radiation window 126, to undergo multiple reflection between reflecting films 122 and 124. Focal line 78 is preferably on the surface of plate 120 to which reflecting film 122 is applied. Thus, focal line 78 is essentially line focused onto reflecting film 122 through radiation window 126. The width of focal line 78 can be referred to as the "beam waist" of input light 77 as focused by lens 80. Thus, the embodiment of the present invention as illustrated in FIG. 7 focuses the beam waist of input light 77 onto the far surface (that is, the surface having reflecting film 122 thereon) of plate 120. By focusing the beam waist on the far surface of plate 120, the present embodiment of the present invention reduces the possibility of overlap between (i) the area of input light 77 as it travels through radiation window 126 (for example, the area "a" illustrated in FIG. 10, discussed in more detail further below), and (ii) the area of light on reflecting film 124 when input light 77 is reflected for the first time by reflecting film 124 (for example, the area "b" illustrated in FIG. 10, discussed in more detail further below). It is desirable to reduce such overlap to ensure proper operation of the VIPA.

In FIG. 7, an optical axis 132 of input light 77 has a small tilt angle $\theta_0$. Assuming the reflectivity of reflecting film 122 is 95%, upon the first reflection off of reflecting film 122, 5% of the light passes through reflecting film 122 and diverges after the beam waist, and 95% of the light is reflected towards reflecting film 124. After being reflecting by reflecting film 124 for the first time, the light again hits reflecting film 122 but is displaced by an amount d. Then, 5% of the light passes through reflecting film 122. In a similar manner, as illustrated in FIG. 7, the light is split into many paths with a constant separation d. The beam shape in each path forms so that the light diverges from virtual images 134 of the beam waist. Virtual images 134 are located with constant spacing 2 t along a line that is normal to plate 120, where t is the thickness of plate 120. The positions of the beam waists in virtual images 134 are self-aligned, and there is no need to adjust individual positions. The lights diverging from virtual images 134 interfere with each other and form collimated light 136 which propagates in a direction that changes in accordance with the wavelength of input light 77.

The spacing of light paths is $d = 2t \sin \theta_0$, and the difference in the path lengths between adjacent beams is $2t \cos \theta_0$. The angular dispersion is proportional to the ratio of these two numbers, which is $\cot \theta_0$. As a result, a VIPA produces a significantly large angular dispersion.

As easily seen from FIG. 7, the term "virtually imaged phased array" arises from the formation of an array of virtual images 134.

Figure 8:
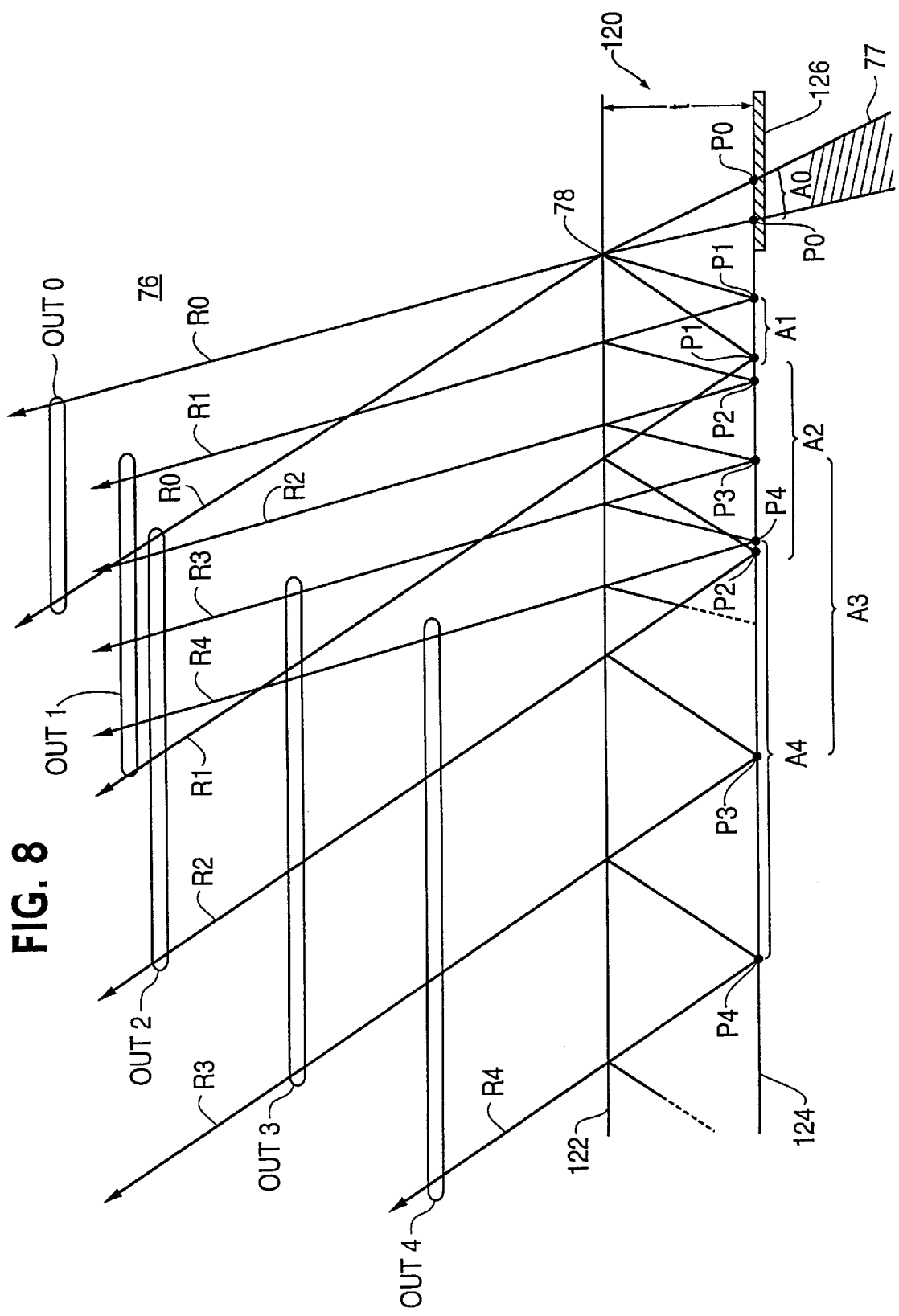
FIG. 8 is a diagram illustrating a cross-section along lines VIII—VIII of the VIPA illustrated in FIG. 6, according to embodiment of the present invention.

FIG. 8 is a diagram illustrating a cross-section along lines VIII—VIII of VIPA 76 illustrated in FIG. 6, according to embodiment of the present invention. Referring now to FIG. 8, plate 120 has reflecting surfaces 122 and 124 thereon. Reflecting surfaces 122 and 124 are in parallel with each other and spaced by the thickness t of plate 120. Reflecting surfaces 122 and 124 are typically reflecting films deposited on plate 120. As previously described, reflecting surface 124 has a reflectance of approximately 100%, except in radiation window 126, and reflecting surface 122 has a reflectance of approximately 95% or higher. Therefore, reflecting surface 122 has a transmittance of approximately 5% or less so that approximately 5% or less of light incident on reflecting surface 122 will be transmitted therethrough and approximately 95% or more of the light will be reflected. The reflectances of reflecting surfaces 122 and 124 can easily be changed in accordance with the specific VIPA application. However, generally, reflecting surface 122 should have a reflectance which is less than 100% so that a portion of incident light can be transmitted therethrough.

Reflecting surface 124 has radiation window 126 thereon. Radiation window 126 allows light to pass therethrough, and preferably has no reflectance, or a very low reflectance. Radiation window 126 receives input light 77 to allow input light 77 to be received between, and reflected between, reflecting surfaces 122 and 124.

Since FIG. 8 represents a cross-section along lines VIII—VIII in FIG. 6, focal line 78 in FIG. 6 appears as a "point" in FIG. 8. Input light 77 then propagates radially from focal line 78. Moreover, as illustrated in FIG. 8, focal line 78 is positioned on reflecting surface 122. Although it is not required for focal line 78 to be on reflecting surface 122, a shift in the positioning of focal line 78 may cause small changes in the characteristics of VIPA 76.

As illustrated in FIG. 8, input light 77 enters plate 120 through an area A0 in radiation window 126, where points P0 indicate peripheral points of area A0.

Due to the reflectivity of reflecting surface 122, approximately 95% or more of input light 77 is reflected by reflecting surface 122 and is incident on area A1 of reflecting surface 124. Points P1 indicate peripheral points of area A1. After reflecting off area A1 on reflecting surface 124, input light 77 travels to reflecting surface 122 and is partially transmitted through reflecting surface 122 as output light Out1 defined by rays R1. In this manner, as illustrated in FIG. 8, input light 77 experiences multiple reflections between reflecting surfaces 122 and 124, wherein each reflection off of reflecting surface 122 also results in a respective output light being transmitted therethrough. Therefore, for example, input light 77 reflects off of areas A2, A3 and A4 to produce output lights Out2, Out3 and Out4. Points P2 indicate peripheral points of area A2, points P3 indicate peripheral points of area A3, and points P4 indicate peripheral points of area A4. Output light Out2 is defined by rays R2, output light Out3 is defined by rays R3 and output light Out4 is defined by rays R4. Although FIG. 8 only illustrates output lights Out0, Out1, Out2, Out3 and Out4, there will actually be many more output lights, depending on the power on input light 77 and the reflectances of reflecting surfaces 122 and 124. As will be discussed in more detail further below, the output lights interfere with each other to produce a luminous flux having a direction which changes in accordance with the wavelength of input light 77.

Figure 9:
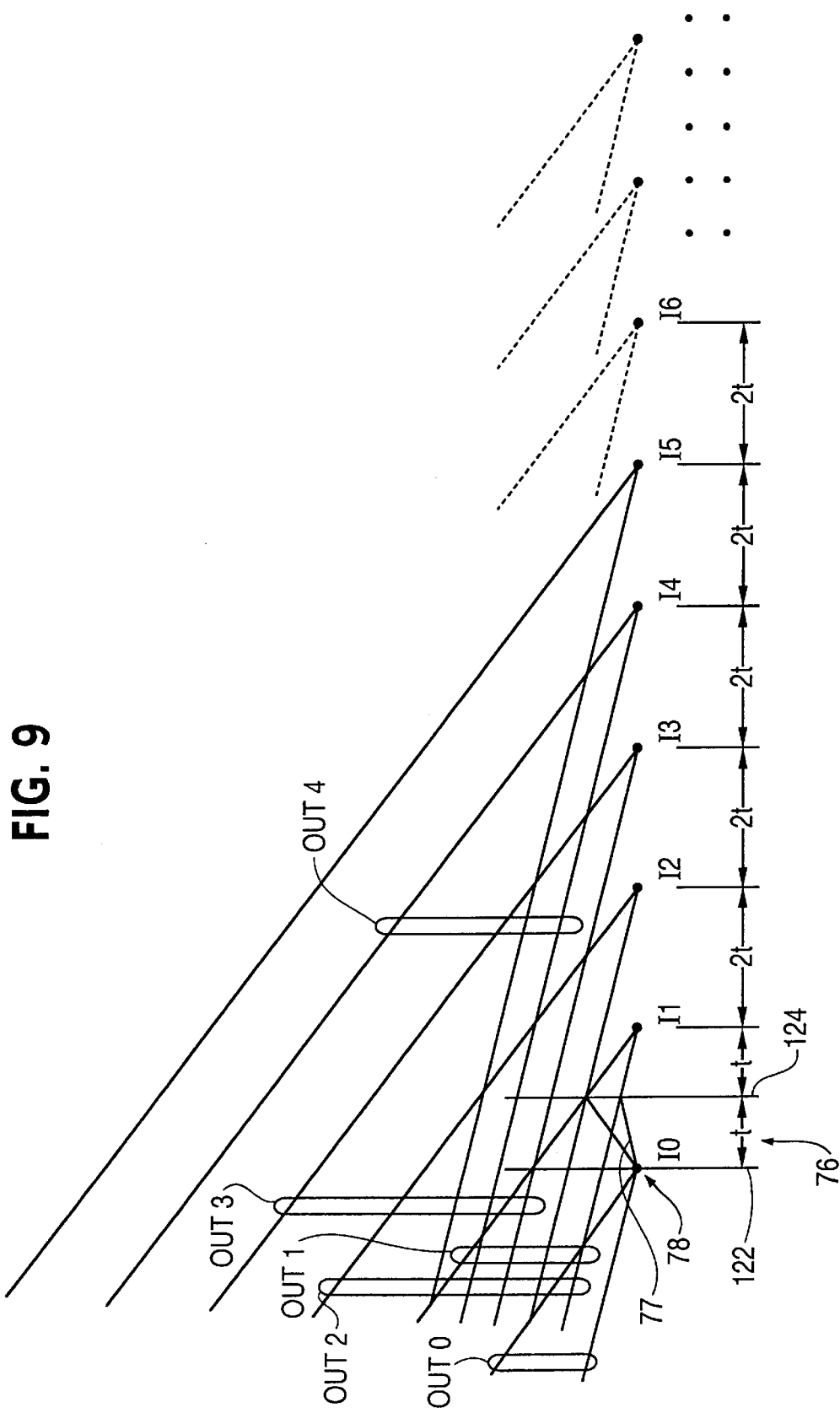
FIG. 9 is a diagram illustrating interference produced by a VIPA, according to an embodiment of the present invention.

FIG. 9 is a diagram illustrating interference produced by a VIPA, according to an embodiment of the present invention. Referring now to FIG. 9, light travelling from focal line 78 is reflected by reflecting surface 124. As previously described, reflecting surface 124 has a reflectance of approximately 100% and, therefore, functions essentially as a mirror. As a result, output light Out1 can be optically analyzed as if reflecting surfaces 122 and 124 did not exist and, instead, output light Out1 was emitted from a focal line $I_1$. Similarly, output lights Out2, Out3 and Out4 can be optically analyzed as if they were emitted from focal lines $I_2$, $I_3$ and $I_4$, respectively. The focal lines $I_1$, $I_2$, $I_3$ and $I_4$ are virtual images of a focal line $I_0$.

Therefore, as illustrated in FIG. 9, focal line $I_1$ is a distance 2 t from focal line $I_0$, where t equals the distance between reflecting surfaces 122 and 124. Similarly, each subsequent focal line is a distance 2 t from the immediately preceding focal line. Thus, focal line $I_2$ is a distance 2 t from focal line $I_1$. Moreover, each subsequent multiple reflection between reflecting surfaces 122 and 124 produces an output light which is weaker in intensity than the previous output light. Therefore, output light Out2 is weaker in intensity than output light Out1.

As illustrated in FIG. 9, output lights from the focal lines overlap and interfere with each other. This interference produces a luminous flux which travels in a specific direction depending on the wavelength of input light 77.

A VIPA according to the above embodiments of the present invention has strengthening conditions which are characteristics of the design of the VIPA. The strengthening conditions increase the interference of the output lights so that a luminous flux is formed. The strengthening conditions of the VIPA are represented by the following Equation (1):

$$2\ t \times \cos\theta = m\lambda$$

where θ indicates the propagation direction of the resulting luminous flux as measured from a line perpendicular to the surface of reflecting surfaces 122 and 124, λ indicates the wavelength of the input light, t indicates the distance between the reflecting surfaces 122 and 124, and m indicates an integer Therefore, if t is constant and m is assigned a specific value, then the propagation direction θ of the luminous flux formed for input light having wavelength λ can be determined.

More specifically, input light 77 is radially dispersed from focal line 78 through a specific angle. Therefore, input light having the same wavelength will be travelling in many different direction from focal line 78, to be reflected between reflecting surfaces 122 and 124. The strengthening conditions of the VIPA cause light travelling in a specific direction to be strengthened through interference of the output lights to form a luminous flux having a direction corresponding to the wavelength of the input light. Light travelling in different direction than the specific direction required by the strengthening condition will be weakened by the interference of the output lights.

Figure 10:
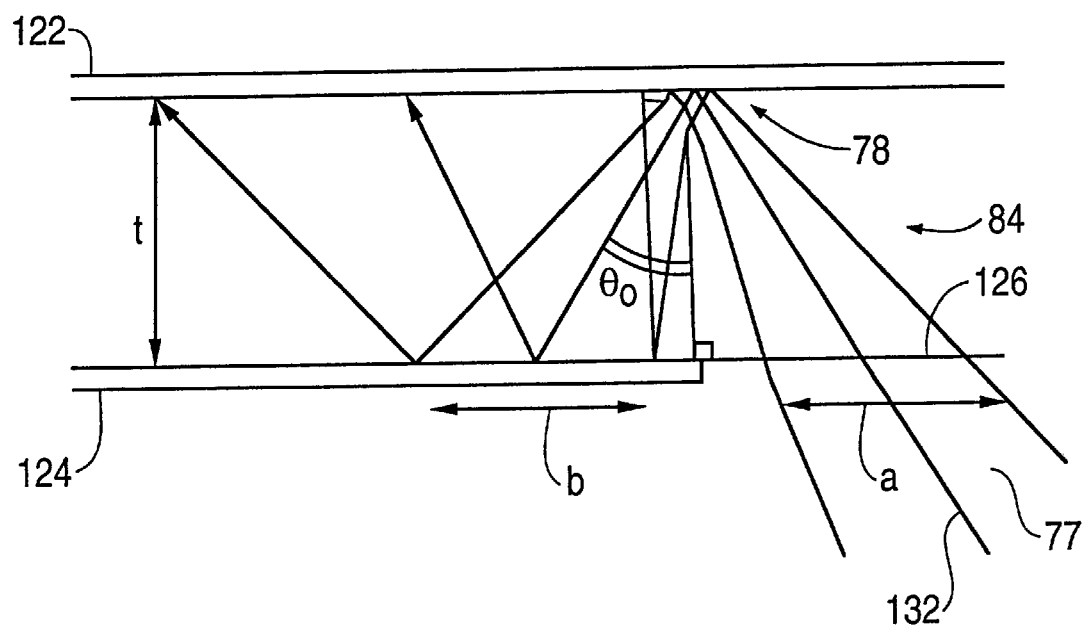
FIG. 10 is a diagram illustrating a cross-section along lines VIII—VIII of the VIPA illustrated in FIG. 6, for determining the tilt angle of input light, according to an embodiment of the present invention.

FIG. 10 is a diagram illustrating a cross-section along lines VIII—VIII of the VIPA illustrated in FIG. 6, showing characteristics of a VIPA for determining the angle of incidence, or tilt angle, of input light, according to an embodiment of the present invention.

Referring now to FIG. 10, input light 77 is collected by a cylindrical lens (not illustrated) and focused at focal line 78. As illustrated in FIG. 10, input light 77 covers an area having a width equal to "a" on radiation window 126. After input light 77 is reflected one time from reflecting surface 122, input light 77 is incident on reflecting surface 124 and covers an area having a width equal to "b" on reflecting surface 124. Moreover, as illustrated in FIG. 10, input light 77 travels along optical axis 132 which is at a tilt angle $\theta_0$ with respect to the normal to reflecting surface 122.

The tilt angle $\theta_0$ should be set to prevent input light 77 from travelling out of radiation window 126 after being reflected the first time by reflecting surface 122. In other words, the tilt angle $\theta_0$ should be set so that input light 77 remains "trapped" between reflecting surfaces 122 and 124 and does not escape through radiation window 126. Therefore, to prevent input light 77 from travelling out of radiation window 126, the tilt angle $\theta_0$ should be set in accordance with the following Equation (2):

tilt of optical axis $\theta_0 \geq (a+b)/4\ t$

The term (a+b) becomes minimum when a=b, which is the situation that focal line 78 is located on reflecting surface 122.

Therefore, as illustrated by FIGS. 6–10, embodiments of the present invention include a VIPA which receives an input light having a respective wavelength within a continuous range of wavelengths. The VIPA causes multiple reflection of the input light to produce self-interference and thereby form an output light. The output light is spatially distinguishable from an output light formed for an input light having any other wavelength within the continuous range of wavelengths. For example, FIG. 8 illustrates an input light 77 which experiences multiple reflection between reflecting surfaces 122 and 124. This multiple reflection produces a plurality of output lights Out0, Out1, Out2, Out3 and Out 4 which interfere with each other to produce a spatially distinguishable luminous flux for each wavelength of input light 77. "Self-interference" is a term indicating that interference occurs between a plurality of lights or beams which all originate from the same source. Therefore, the interference of output lights Out0, Out1, Out2, Out3 and Out4 is referred to as self-interference of input light 77, since output lights Out0, Out1, Out2, Out3 and Out4 all originate from the same source (that is, input light 77).

According to the above embodiments of the present invention, an input light can be at any wavelength within a continuous range of wavelengths. Thus, the input light is not limited to being a wavelength which is a value chosen from a range of discrete values.

In addition, according to the above embodiments of the present invention, the output light produced for an input light at a specific wavelength within a continuous range of wavelengths is spatially distinguishable from an output light which would have been produced if the input light was at a different wavelength within the continuous range of wavelengths. Therefore, as illustrated, for example, in FIG. 6, the travelling direction (that is, a "spatial characteristic") of the luminous flux 82 is different when input light 77 is at different wavelengths within a continuous range of wavelengths. Moreover, referring to FIG. 6, for example, if input light 77 included all three wavelengths $\lambda 1$, $\lambda 2$ and $\lambda 3$, then luminous fluxes 82*a*, 82*b* and 82*c* would be simultaneously produced, each travelling in a different direction.

According to the above embodiments of the present invention, a focal line is described as being on the opposite surface of a parallel plate from which input light enters. However, the focal line can be, for example, in the parallel plate, on the surface of the radiation window, or before the radiation window.

According to the above embodiments of the present invention, two reflecting films reflect light therebetween, with the reflectance of one reflecting film being approximately 100%. However, a similar effect can be obtained with two reflecting films each having a reflectance of less than 100%. For example, both reflecting films can have a reflectance of 95%. In this case, each reflecting film has light travelling therethrough and causing interference. As a result, a luminous flux traveling in the direction depending on the wavelength is formed on both sides of the parallel plate on which the reflecting films are formed. Thus, the various reflectances of the various embodiments of the present invention can easily be changed in accordance with required characteristics of a VIPA.

According to the above embodiments of the present invention, a waveguide device is described as being formed by a parallel plate, or by two reflecting surfaces in parallel with each other. However, the plate or reflecting surfaces do not necessarily have to be parallel.

According to the above embodiments of the present invention, a VIPA uses multiple-reflection and maintains a constant phase difference between interfering lights. As a result, the characteristics of the VIPA are stable, thereby reducing optical characteristic changes causes by polarization. By contrast, the optical characteristics of a conventional diffraction grating experience undesirable changes in dependance on the polarization of the input light.

The above embodiments of the present invention are described as providing luminous fluxes which are "spatially distinguishable" from each other. "Spatially distinguishable" refers to the luminous fluxes being distinguishable in space. For example, various luminous fluxes are spatially distinguishable if they are collimated and travel in different directions, or are focused in different locations. However, the present invention is not intended to be limited to these precise examples, and there are other ways in which luminous fluxes can be spatially distinguished from each other.

Figure 11:
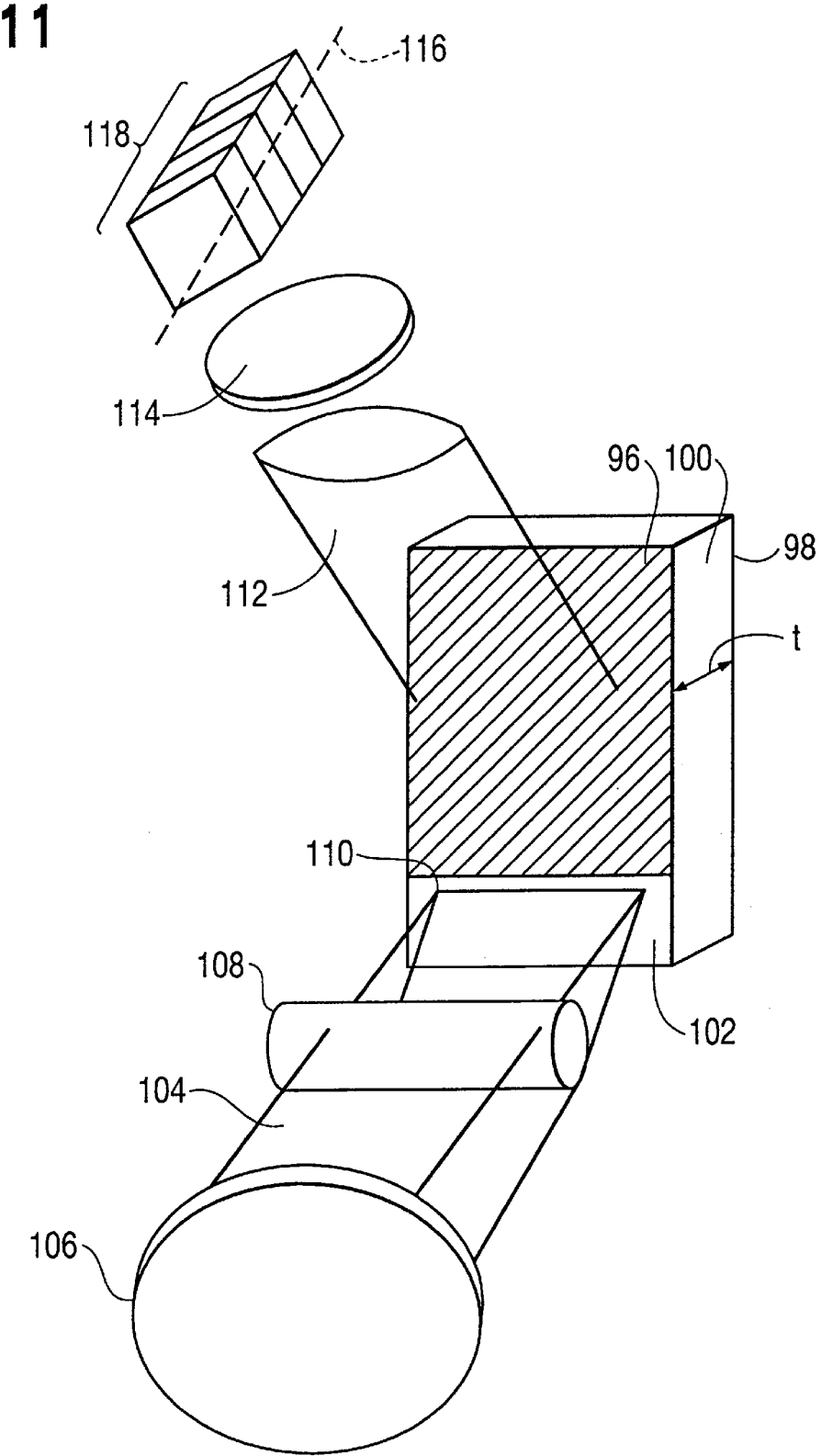
FIG. 11 is a diagram illustrating a VIPA as used with a receiver, according to an embodiment of the present invention.

FIG. 11 is a diagram illustrating a VIPA as used with a receiver, according to an embodiment of the present invention. Referring now to FIG. 11, multiple-layer reflecting films 96 and 98 are applied on both sides of a parallel plate 100 made of glass having a thickness, t, of, for example, 100 $\mu$m. It is preferable for parallel plate 100 to have a thickness in the range of 20 to 2000 $\mu$m. Reflecting films 96 and 98 are preferably multiple-layer, high-reflectance interference films.

The reflectance of reflecting film 98 is approximately 100%, and the reflectance of reflecting film 96 is approximately 95%. However, the reflectance of reflecting film 96 is not limited to 95% and can be a different value as long as enough light is reflected from reflecting film 96 to allow for multiple reflections between reflecting films 96 and 98. Preferably, the reflectance of reflecting film 96 is in the range of 80% to a few percentages less than 100%. Moreover, the reflectance of reflecting film 98 is not limited to 100%, but should be high enough to allow multiple reflections between reflecting films 96 and 98.

A radiation window 102 receives input light and is positioned on parallel plate 100 on the same surface as reflecting film 96. Radiation window 102 can be formed by a film having approximately 0% reflectance on the surface of parallel plate 100. As illustrated in FIG. 11, the boundary between radiation window 102 and reflecting film 96 is preferably a straight line.

The input light is output from, for example, an optical fiber (not illustrated) and received by a collimating lens 106. Collimating lens 106 converts the input light into parallel beams 104 which are received by a cylindrical lens 108. Cylindrical lens 108 focuses parallel beams 104 into a focal line 110 on radiation window 102. Focal line 110 is positioned close to and parallel with the straight line boundary between reflecting film 96 and radiation window 102. In this manner, input light enters parallel plate 100 via radiation window 102.

The optical axis of input light 102 is at a tilt angle with respect to the normal to reflecting film 96 so that input light will not escape through radiation window 102 after entering parallel plate 100. Thus, the tilt angle is set in accordance with Equation (2), above.

Once inside parallel plate 100, the input light experiences multiple reflection between reflecting films 96 and 98 (as illustrated, for example, in FIG. 8). Each time the input light is incident on reflecting film 96, approximately 95% of the light is reflected towards reflecting film 98 and approximately 5% of the light passes through reflecting film 96 to form an output light (such as, for example, output light Out1 illustrated in FIG. 8). Multiple reflections between reflecting films 96 and 98 cause a plurality of output lights to be formed. The plurality of output lights interfere with each other to form a luminous flux 112 having a propagation direction which depends on the wavelength of the input light.

Luminous flux 112 is then collected by a lens 114, which focuses luminous flux 112 at a collection point. The collection point moves along a straight line path 116 for different wavelengths of the input light. For example, as the wavelength of the input light increases, the collection point is moved farther along straight line path 116. A plurality of receivers 118 are arranged on straight line path 116 to receive the focused luminous flux 112. Therefore, each receiver 118 can be positioned to receive a luminous flux corresponding to a specific wavelength.

By controlling the distance t between the reflecting films or reflecting surfaces of the VIPA, the phase difference of light reflected between the reflecting films or reflecting surfaces and can be shifted by a predetermined amount, thereby realizing excellent environmental resistance. Moreover, the above embodiments of the present invention experience only a small change in optical characteristics depending on the optical polarization.

Figure 12:
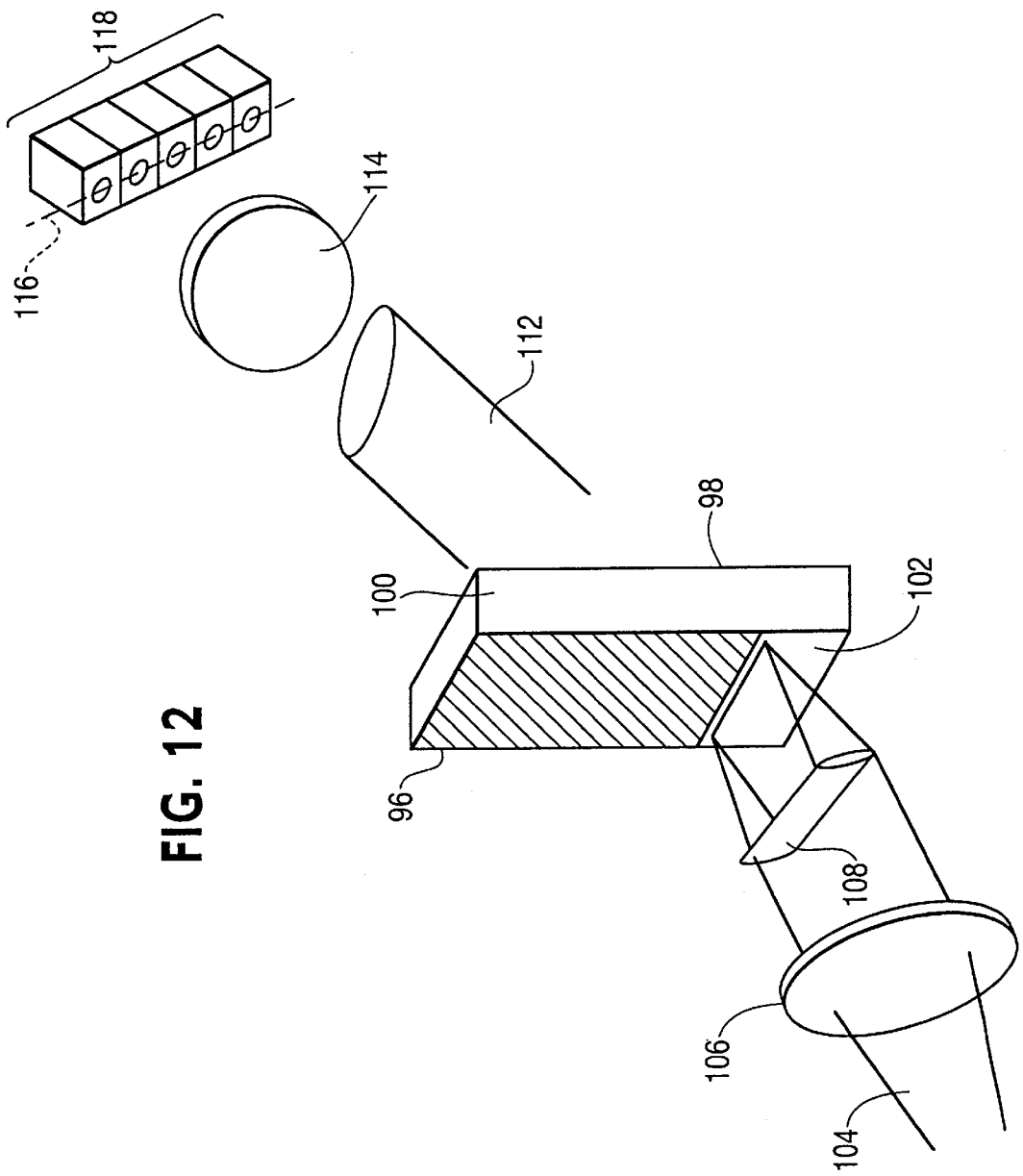
FIG. 12 is a diagram illustrating a VIPA as used with a receiver, according to an additional embodiment of the present invention.

FIG. 12 is a diagram illustrating a VIPA as used with a receiver, according to an additional embodiment of the present invention. The VIPA illustrated in FIG. 12 is similar to the VIPA illustrated in FIG. 11, except that the reflectances of reflecting films 96 and 98 are reversed. More specifically, in the VIPA illustrated in FIG. 12, reflecting film 98 has a reflectance of approximately 95% and reflecting film 96 has a reflectance of approximately 100%. As illustrated in FIG. 12, luminous flux 112 is formed through interference of output light travelling through reflecting film 98. Thus, the input light enters one side of parallel plate 100, and luminous flux 112 is formed on the opposite side of parallel plate 100. Otherwise, the VIPA illustrated in FIG. 12 operates in a similar manner as the VIPA illustrated in FIG. 11.

FIG. 13 is a diagram illustrating a waveguide type VIPA, according to an embodiment of the present invention. Referring now to FIG. 13, light 138 is output from an optical fiber (not illustrated) and received by a waveguide 140 provided on a substrate 142. Waveguide 140 is, for example, lithium niobate. Light 138 contains optical signals modulated on a plurality of carriers having different wavelengths.

Light 138 typically has a dispersed width as it is output from the optical fiber. Therefore, a collimating lens 142 converts light 138 into parallel light. The parallel light is then collected by a cylindrical lens 144 and focused into a focal line 146. The light then radiates into a VIPA 148 from focal line 146 through a radiation window 150.

VIPA 148 comprises reflecting films 152 and 154 on a parallel plate 156. Reflecting film 154 is on one side of a parallel plate 156, and reflecting film 152 and radiation window 150 are on the other side of parallel plate 156. Reflecting film 152 has a reflectance of approximately 100%, and reflecting film 154 has a reflectance of less than 100%. A luminous flux 158 of light reflected by parallel plate 156 is output to the side of parallel plate 156 opposite to radiation window 150.

If input light 138 includes a plurality of wavelengths, a plurality of luminous fluxes 158 will be formed which travel in different directions depending of the wavelengths of input light 138. Luminous flux 158 formed by VIPA 148 is focused by a lens 160 at different points, depending on the propagation direction of luminous flux 158. Therefore, as illustrated in FIG. 13, luminous fluxes 158a, 158b and 158c having wavelengths λ1, λ2, and λ3, respectively, are formed at different collection points.

A plurality of receiving waveguides 162 are provided at the collection points. Each receiving waveguide 162 guides an optical signal and corresponding carrier having a single wavelength. Therefore, a plurality of luminous fluxes can be simultaneously received and transmitted through various channels. Each receiving waveguide 162 has a corresponding receiver (not illustrated) provided at a later stage. The receiver is typically a photodiode. Therefore, light guided by each receiving waveguides 162 is processed after being detected by the corresponding receiver.

Unfortunately, in some VIPA applications, the beam size in the top view of the resulting luminous flux may not be large enough to provide optimal operation, as will be described in more detail below.

Figure 14A:
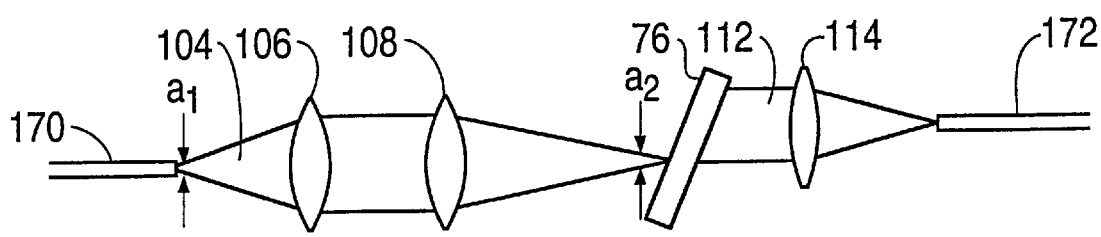
FIG. 14(A) is a side view of an apparatus using a VIPA.
Figure 14B:
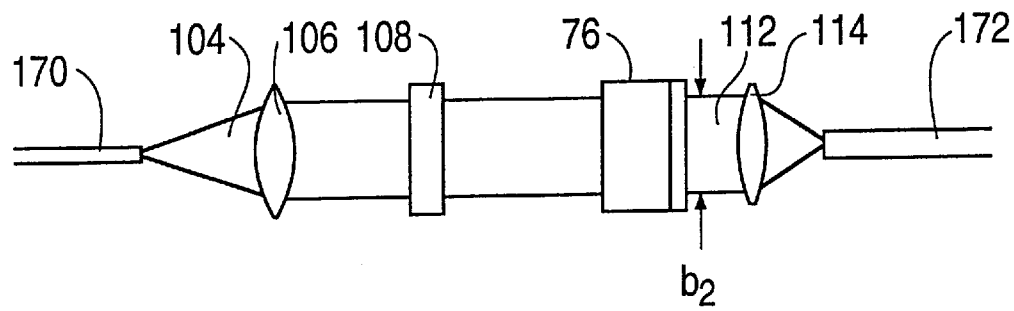
FIG. 14(B) is a top view of the apparatus, according to an embodiment of the present invention.

For example, FIG. 14(A) is a side view of an apparatus using a VIPA, and FIG. 14(B) is a top view of the apparatus. Referring now to FIGS. 14(A) and 14(B), an input light 104 travels from an input fiber 170 to collimating lens 106. Collimating lens 106 converts input light 104 into parallel beams which are received by cylindrical lens 108. Cylindrical lens 108 focuses parallel beams into VIPA 76, which forms luminous flux 112. Luminous flux 112 is then focused by lens 114 to an output fiber 172.

The light has beam widths of $a_1$ and $a_2$ in the side view of FIG. 14(A), and a beam width of $b_2$ in the top view of FIG. 14(B).

Figure 15:
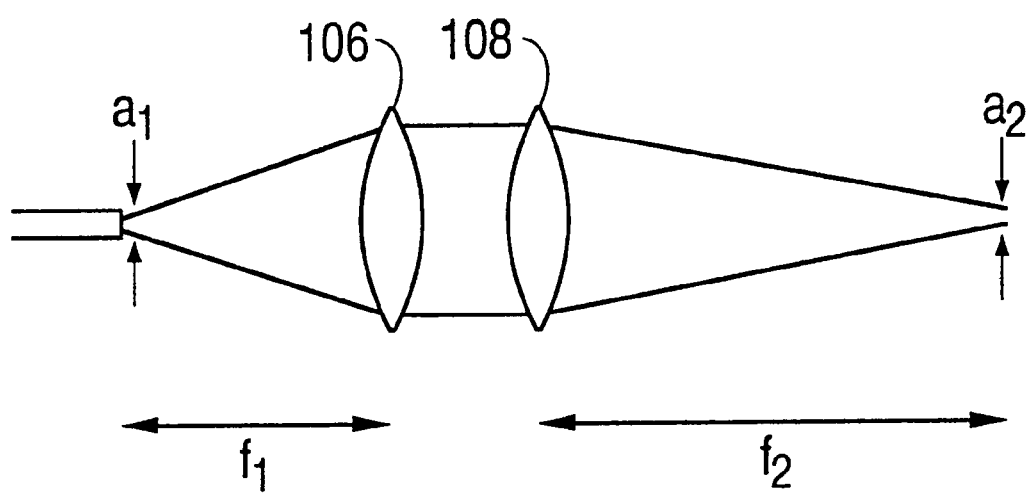
FIG. 15 is a simplified diagram of the side view in FIG. 14(A), according to an embodiment of the present invention.

FIG. 15 is a simplified diagram of the side view in FIG. 14(A). Referring now to FIG. 15, collimating lens 106 and cylindrical lens 108 have focal lens $f_1$ and $f_2$, respectively. The ideal beam size $a_2$ is determined by parameters such as the thickness of VIPA 76 and the light incident angle into VIPA 76. As shown in FIG. 15, the beam size is expanded through the ratio of focal lengths $f_1$ and $f_2$. More specifically:

$$a_2/a_1 = f_2/f_1$$

For a specific application, $a_1$, $a_2$ and the distance from input fiber 170 to VIPA 76 are typically given, or fixed. Therefore, the maximum focal length $f_1$ can easily be determined. However, the beam size $b_2$ is determined by the focal length $f_1$, and the maximum allowable focal length $f_1$ will not typically provide a large enough beam size $b_2$.

The following indicates reasons why a large beam size $b_2$ is necessary.

Figure 16:
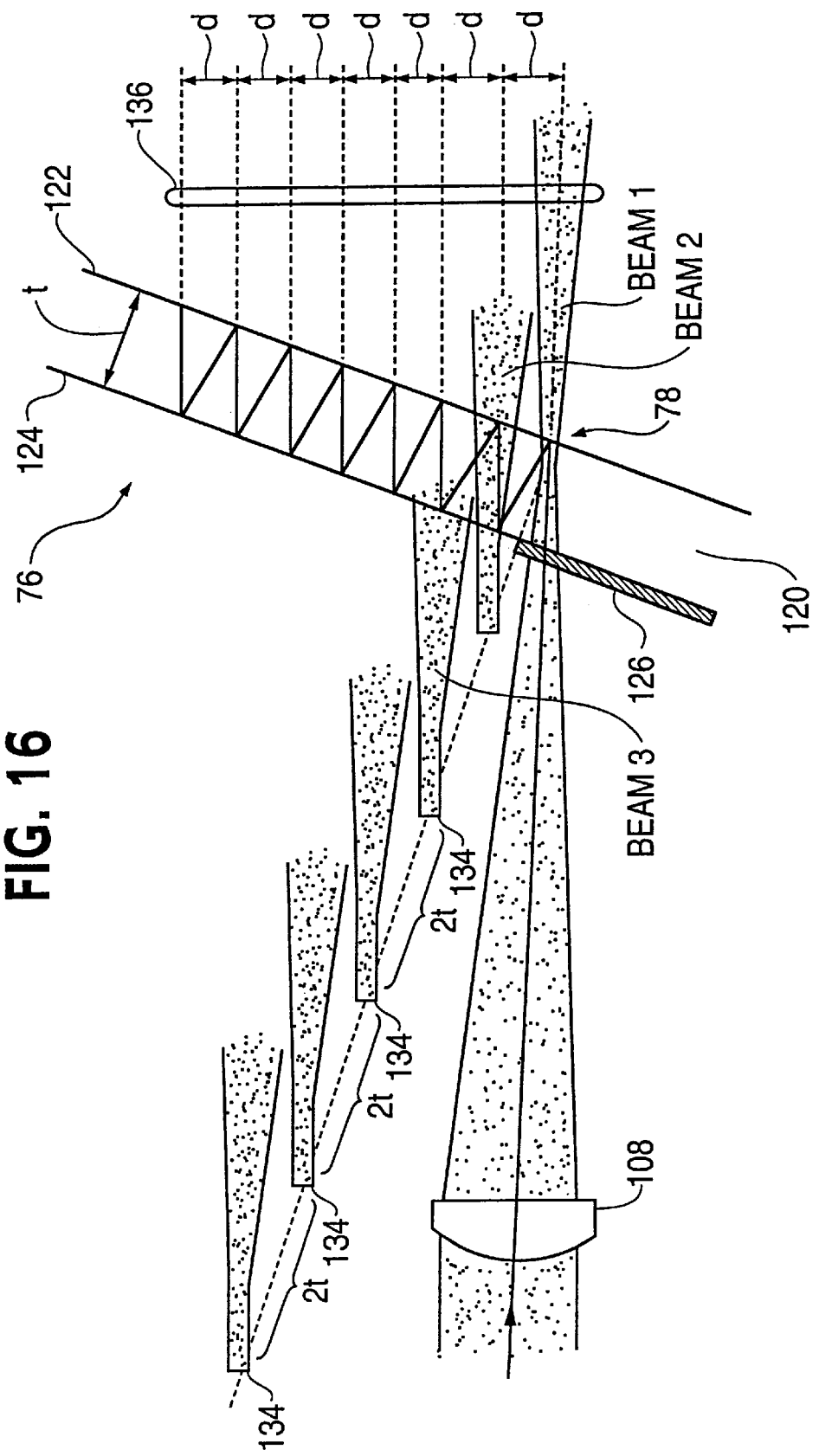
FIG. 16 is a diagram illustrating the operation of a VIPA, according to an embodiment of the present invention.

FIG. 16 is a diagram illustrating the operation of VIPA 76. FIG. 16 shows the same operation as in FIG. 7, but labels the first three interfering lights as BEAM 1, BEAM 2 and BEAM 3, respectively. Each of the interfering lights could be assigned a corresponding beam number. For example, the 100th interfering light could be referred to as BEAM 100.

Figure 17A:
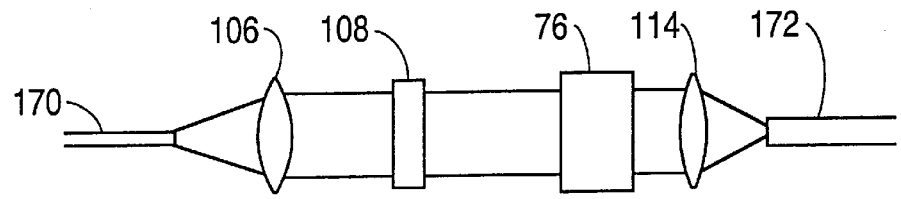
FIGS. 17(A), 17(B) and 17(C) are diagrams illustrating top views of an apparatus using a VIPA for first, second and third successive interfering lights, respectively, according to an embodiment of the present invention.
Figure 17B:
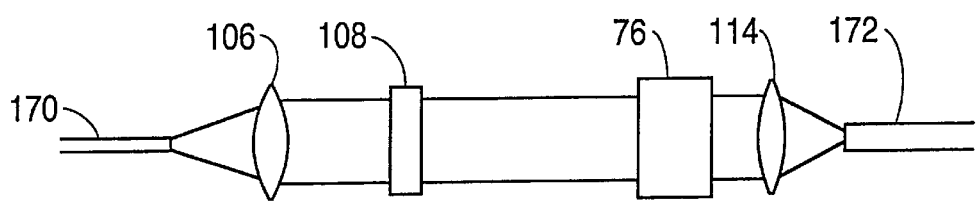
Figure 17C:
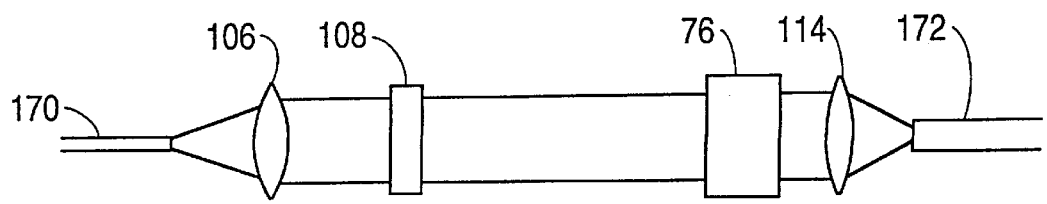

FIGS. 17(A), 17(B) and 17(C) are diagrams illustrating top views of the apparatus for BEAM 1, BEAM 2 and BEAM 3, respectively. Since FIG. 17(A) illustrates the apparatus for BEAM 1, FIG. 17(A) shows the actual physical position of input fiber 170, collimating lens 106 and cylindrical lens 108. By contrast, since FIG. 17(B) illustrates the apparatus for BEAM 2, FIG. 17(B) shows the "virtual" position of input fiber 170, collimating lens 106 and cylindrical lens 108. Similarly, since FIG. 17(C) illustrates the apparatus for BEAM 3, FIG. 17(C) shows the "virtual" position of input fiber 170, collimating lens 106 and cylindrical lens 108. As can be seen from FIGS. 17(A), 17(B) and 17(C), the "virtual" positions of elements upstream of VIPA 76 will move farther away from VIPA 76 for each subsequent interfering light.

Figure 18A:
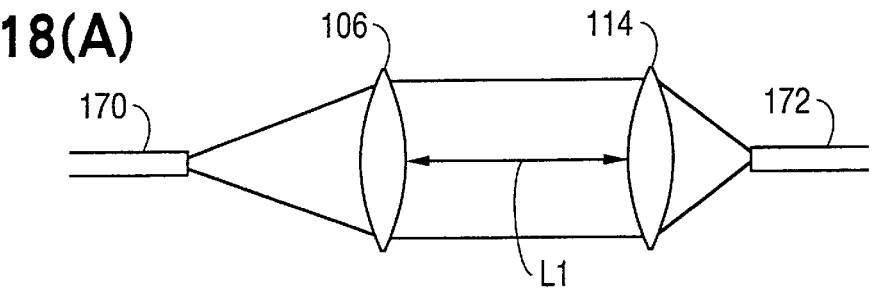
FIGS. 18(A), 18(B) and 18(C) are diagrams illustrating equivalent systems to those in FIGS. 17(A), 17(B) and 17(C), respectively, according to an embodiment of the present invention.
Figure 18B:
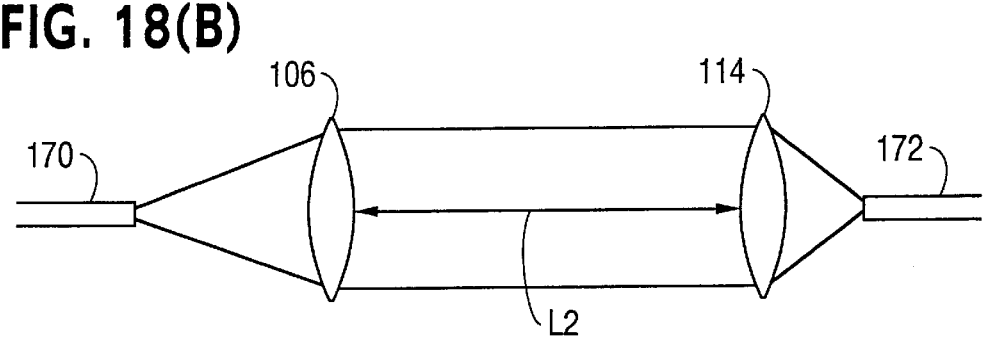
Figure 18C:
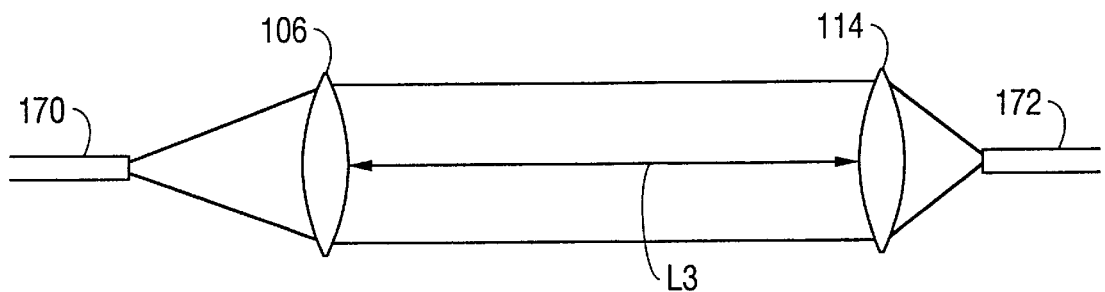

FIGS. 18(A), 18(B) and 18(C) are diagrams illustrating equivalent systems to those in FIGS. 17(A), 17(B) and 17(C), respectively. Moreover, FIGS. 18(A), 18(B) and 18(C) illustrate different lengths $L_1$, $L_2$ and $L_3$, respectively, between lenses. As can be seen from FIGS. 18(A), 18(B) and 18(C), the lengths between the lenses will increase for each subsequent interfering light. Therefore, for example, the length for the 100th interfering light (BEAM 100) will be relatively long.

Due to the diffraction limited, a collimated light will diverge as the distance travelled by the light increases. Therefore, lights having a very long travel distance, such as BEAM 100, may diverge too much. As a result, the VIPA will not provide enough interference between the various interfering lights.

As an example, for a typical configuration and depending on various factors such as the thickness of the VIPA, $L_1$ for BEAM 1 will typically be 1 cm. $L_{100}$ for BEAM 100 will typically be 20 cm. Thus, there is a relatively large difference between L, and $L_{100}$. As a result, BEAM 100 may diverge too much to provide an appropriate amount of interference.

A larger beam size $b_2$ may solve this problem by maintaining a collimated light for a longer distance. However, as described above, the apparatus in FIGS. 14(A) and 14(B) will not provide a large enough beam size $b_2$ for many applications.

As an example, assume that the beam size $b_2$ should be greater than 3 mm, which is a preferable size for a typical application. Unfortunately, since $a_1$, $a_2$ and the distance from input fiber 170 to VIPA 76 are typically fixed, the maximum allowable focal length $f_1$ will not be enough to provide a beam size $b_2$ greater than 3 mm.

Alternatively, the size of the apparatus can be increased to provide a beam size $b_2$ greater than 3 mm. To provide this beam size, $f_1$ would typically be in the range of 2 to 3 cm. Moreover, in a typical configuration, $a_2/a_1$ should be in the range of 3 to 4, so that $f_2$ would be approximately 10 cm. Thus, $f_1+f_2$ would be approximately 13 cm. This total length is too large for many applications. Instead, it would be desirable to have a much more compact apparatus.

Figure 19A:
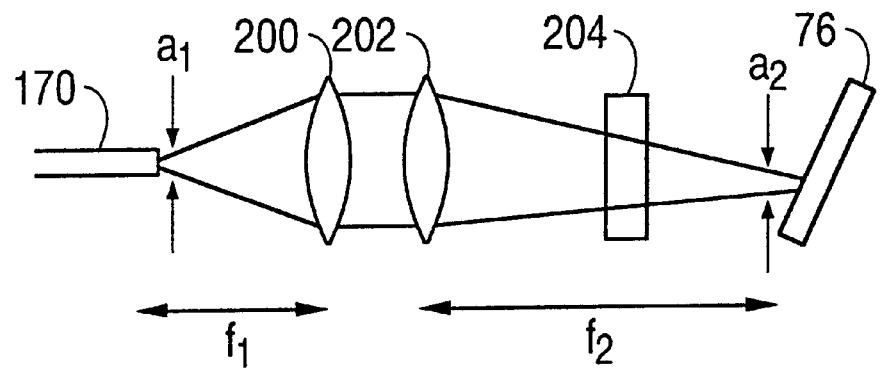
FIG. 19(A) is a side view and FIG. 19(B) is a top view of an apparatus using a VIPA, and which provides a large beam size in the top view, according to an embodiment of the present invention.
Figure 19B:
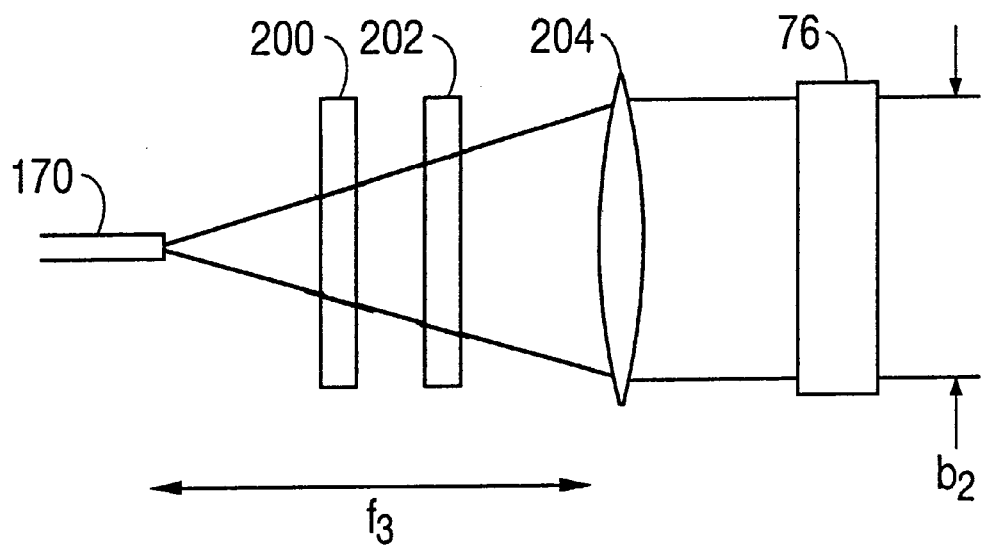

FIG. 19(A) is a side view and FIG. 19(B) is a top view of an apparatus using a VIPA, and which provides a large beam size $b_2$, according to an embodiment of the present invention.

Referring now to FIGS. 19(A) and 19(B), the apparatus has three lenses 200, 202 and 204 between input fiber 170 and VIPA 76. All the lenses are preferably cylindrical or semi-cylindrical lenses, or lenses having a similar function. Lenses 200 and 202 have no lens effect in the top view. Lens 204 has no lens effect in the side view. Focal length $f_3$ can be as long as the distance from input fiber 170 to VIPA 76.

In the side view (that is, in FIG. 19(A)), the light is collimated and focused into VIPA 76 the same way as in FIG. 14(A). Therefore, the beam size $a_2$ can be determined arbitrarily by choosing the right numbers for $f_1$ and $f_2$. Moreover, the beam size $b_2$ can be determined almost independently by the focal length $f_3$ as shown in the top view (FIG. 19(B)).

The apparatus in FIGS. 19(A) and 19(B) can be compared to the apparatus in FIGS. 14(A) and 14(B). For example, as described above for the apparatus in FIGS. 14(A) and 14(B), to provide a beam size $b_2$ greater than 3 mm, $f_1+f_2$ would be approximately 13 cm. By contrast, with the apparatus in FIGS. 19(A) and 19(B), $f_1+f_2$ can be anything, as long as the ratio $f_2/f_1$ is an appropriate ratio. Therefore, $f_1+f_2$ can be very small, and much smaller than 13 cm. Moreover, in FIGS. 19(A) and 19(B), $f_3$ would typically be approximately 2 to 3 cm, to provide a beam size $b_2$ greater than 3 mm. Thus, the apparatus in FIGS. 19(A) and 19(B) can be significantly smaller than the apparatus in FIGS. 14(A) and 14(B).

The above numerical examples are simply intended as general, approximate examples, and are not intended as limitations of the present invention.

Therefore, according to the above embodiments of the present invention, a first lens collimates an input light in the side view and has no lens effect in the top view. A second lens receives the input light from the first lens, and focuses the input light in the side view and has no lens effect in the top view. A third lens receives the input light from the second lens, and collimates the input light in the top view and has no lens effect in the side view. The light from the third lens is received into a VIPA.

Further, lenses 200 and 202 in FIGS. 19(A) and 19(B) can be combined into a single lens.

Figure 20A:
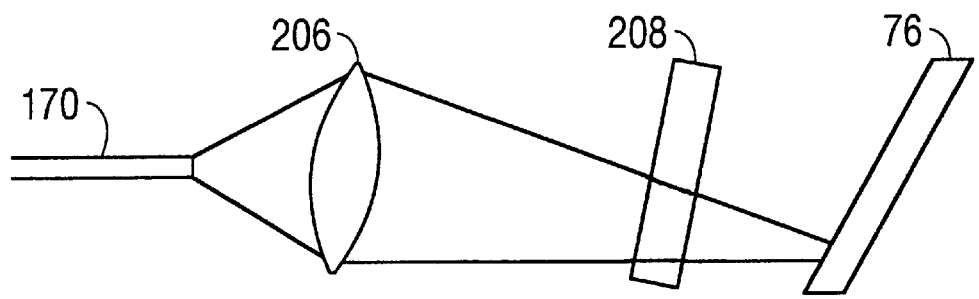
FIG. 20(A) is a side view and FIG. 20(B) is a top view of an apparatus having two lenses between an input fiber and VIPA, according to an embodiment of the present invention.
Figure 20B:
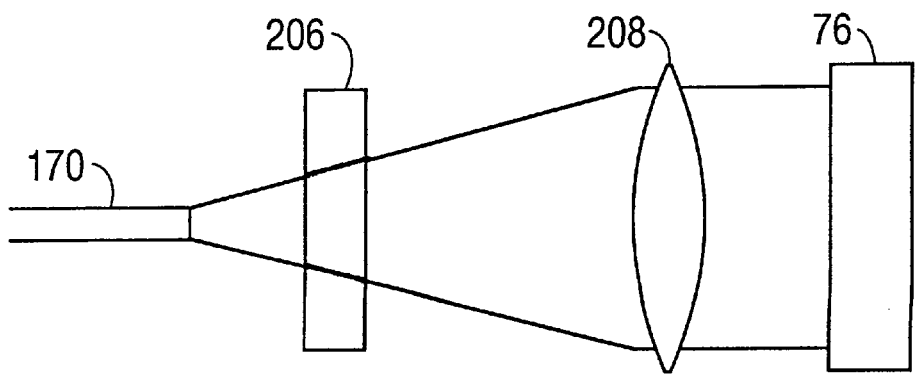

For example, FIG. 20(A) is a side view and FIG. 20(B) is a top view of an apparatus having two lenses between input fiber 170 and VIPA 76, according to an embodiment of the present invention. Referring now to FIGS. 20(A) and 20(B), lens 206 acts as a lens in the side view and has no lens effect in the top view. By contrast, lens 208 acts as a lens in the top view and has no lens effect in the side view.

In various of the above embodiments of the present invention, a VIPA directs a resulting luminous flux to an optical fiber. However, the present invention is also applicable to a VIPA which directs the luminous flux to other points or optical elements. For example, the present invention is applicable to an apparatus which uses a VIPA to compensate for, or to produce, chromatic dispersion by directing the luminous flux to a mirror so that light is reflected back into the VIPA.

Figure 21A:
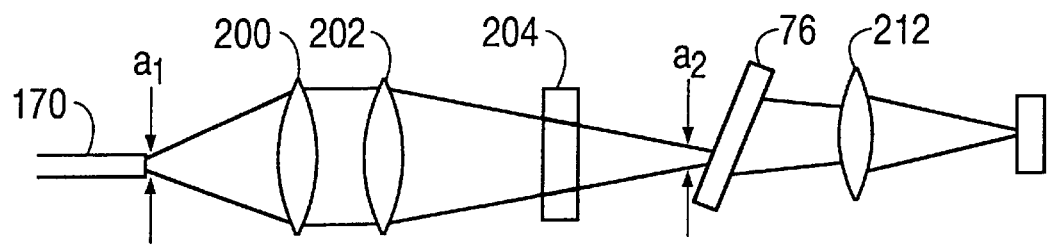
FIGS. 21(A) and 21(B) are diagrams illustrating an apparatus using a VIPA to compensate for, or produce, chromatic dispersion, according to an embodiment of the present invention.
Figure 21B:
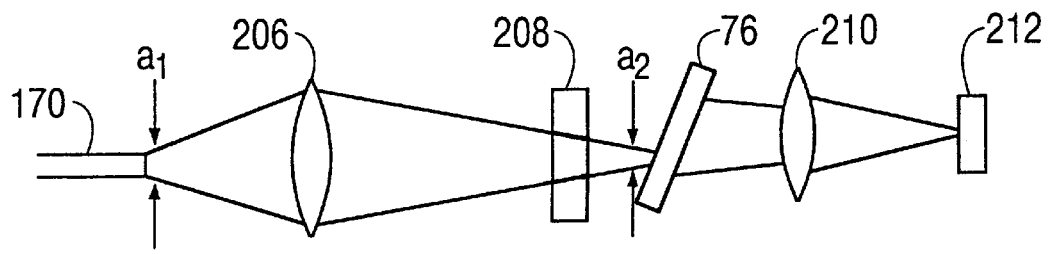

For example, FIGS. 21(A) and 21(B) are diagrams illustrating an apparatus using a VIPA to compensate for, or produce, chromatic dispersion, according to an embodiment of the present invention. Referring now to FIG. 21(A), a luminous flux produced by VIPA 76 is focused by a lens 210 onto a mirror 212. Mirror 212 reflects light back to VIPA 76 so that the returned light undergoes multiple reflection in VIPA 76 and is then output from VIPA 76, through lenses 204, 202 and 200, to input fiber 170. The apparatus in FIG. 21(B) operates in a similar manner, using lenses 206 and 208 instead of lenses 200, 202 and 204. Further details of an apparatus using a VIPA in combination with a light returning device (such as a mirror) is disclosed in U.S. application Ser. No. 08/796,842, filed Feb. 7, 1997, titled "OPTICAL APPARATUS WHICH USES A VIRTUALLY IMAGED PHASED ARRAY TO PRODUCE CHROMATIC DISPERSION", and U.S. application Ser. No. 08/910,251, filed Aug. 13, 1997, titled "OPTICAL APPARATUS WHICH USES A VIRTUALLY IMAGED PHASED ARRAY TO PRODUCE CHROMATIC DISPERSION" and which are incorporated herein by reference.

In FIGS. 19(A), 19(B), 20(A), 20(B), 21(A) and 21(B), each of lenses 200, 202, 204, 206, 208 is preferably a cylindrical lens, a semi-cylindrical lens or a one-dimensional graded index lens. However, the present invention is not intended to be limited to the use of any specific type of lenses.

According to the above embodiments of the present invention, a VIPA includes first and second reflecting surfaces. The second surface has a reflectivity which causes a portion of light incident thereon to be transmitted therethrough. The VIPA receives an input light at a respective wavelength within a continuous range of wavelengths. The first and second surfaces are positioned so that the input light is reflected a plurality of times between the first and second surfaces to cause a plurality of lights to be transmitted through the second surface. The plurality of transmitted lights interfere with each other to produce an output light (such as a luminous flux 82a or 82b in FIG. 6) which is spatially distinguishable from an output light produced for an input light having any other wavelength within the continuous range of wavelengths.

According to the above embodiments of the present invention, a VIPA is described as being formed by a parallel plate, or by two reflecting surfaces in parallel with each other. However, the plate or reflecting surfaces do not necessarily have to be parallel.

According to the above embodiments of the present invention, a light which includes a plurality of wavelengths can be simultaneously divided. Therefore, a receiver for use in wavelength multiplexing communications can be successfully reduced in size.

According to the above embodiments of the present invention, a VIPA can simultaneously split a wavelength multiplexed light for each wavelength of input light. Moreover, the angle of dispersion can be adjusted by the thickness t of the parallel plate forming the VIPA. As a result, the angle of dispersion can be made large enough to allow a receiver to easily receive each split signal. For example, a conventional diffraction grating requires a fine concavo-convex surface for a large angle of dispersion. However, it is very difficult to prepare a fine and precise concavo-convex surface, thereby limiting the size of the angle of dispersion. By contrast, a VIPA according to the above embodiments of the present invention only requires a change in thickness of the parallel plate to realize a relatively large angle of dispersion.

Moreover, a VIPA according to the above embodiments of the present invention produces a larger angle of dispersion than a conventional diffraction grating. Therefore, a receiver which uses a VIPA according to the above embodiments of the present invention can correctly receive an optical signal, without fail, even in wavelength multiplexing communications realizing high-level multiplexing processes. Furthermore, such a receiver has a relatively simple construction and is relatively inexpensive to produce.

According to the above embodiments of the present invention, a VIPA uses multiple-reflection and maintains a constant phase difference between interfering lights. As a result, the characteristics of the VIPA are stable, thereby reducing optical characteristic changes causes by polarization. By contrast, the optical characteristics of a conventional diffraction grating experience undesirable changes in dependance on the polarization of the input light.

Moreover, as compared to an array waveguide grating, a VIPA according to the above embodiments of the present invention requires a relatively simple configuration and achieves stable optical characteristics and resistance to changes in environmental conditions.

In the above embodiments of the present invention, a VIPA has reflecting films to reflect light. For example, FIG. 7 illustrates a VIPA 76 having reflecting films 122 and 124 to reflect light. However, it is not intended for a VIPA to be limited to the use of "film" to provide a reflecting surface. Instead, the VIPA must simply have appropriate reflecting surfaces, and these reflecting surfaces may or may not be formed by "film".

Further, in the above embodiments of the present invention, a VIPA includes a transparent glass plate in which multiple reflection occurs. For example, FIG. 7 illustrates a VIPA 76 having a transparent glass plate 120 with reflecting surfaces thereon. However, it is not intended for a VIPA to be limited to the use of a glass material, or any type of "plate", to separate the reflecting surfaces. Instead, the reflecting surfaces must simply be separated from each other. For example, the reflecting surfaces of a VIPA can simply have "air" therebetween, instead of a glass plate, with the reflecting surfaces stably sustained by a material such as glass or metal with low thermal expansion. Therefore, the reflecting surfaces can be described as having a transparent material therebetween which is, for example, optical glass or air.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus having a side view and a top view and receiving an input light at a respective wavelength within a continuous range of wavelengths, the apparatus comprising:

a first lens collimating the input light in the side view and having no lens effect in the top view;

a second lens receiving the input light from the first lens, the second lens focusing the input light in the side view and having no lens effect in the top view;

a third lens receiving the input light from the second lens, the third lens collimating the input light in the top view and having no lens effect in the side view; and an angular dispersive device having first and second surfaces, the second surface having a reflectivity which causes a portion of light incident thereon to be transmitted therethrough, the angular dispersive device receiving the input light from the third lens, the first and second surfaces being positioned so that the input light is reflected a plurality of times between the first and second surfaces to cause a plurality of lights to be transmitted through the second surface, the plurality of transmitted lights interfering with each other to produce an output light which is spatially distinguishable from an output light produced for an input light having any other wavelength within the continuous range of wavelengths.

2. An apparatus as in claim 1, wherein the first, second and third lenses cause the input light to be focused inside the angular dispersive device at a focused position, the input light having a corresponding beam size at the focused position in the side view, the first, second and third lenses have focal lengths $f_1$, $f_2$ and $f_3$, respectively, and the beam size in the side view is determined by the ratio $f_1/f_2$.

3. An apparatus as in claim 1, wherein the first, second and third lenses cause the input light to be focused inside the angular dispersive device at a focused position, the input light having a corresponding beam size at the focused position in the top view, the first, second and third lenses have focal lengths $f_1$, $f_2$ and $f_3$, respectively, and the beam size in the top view is determined by the focal length $f_3$.

4. An apparatus as in claim 1, wherein
the first, second and third lenses cause the input light to be focused inside the angular dispersive device at a focused position, the input light having a corresponding beam size at the focused position in the top view,
the first, second and third lenses have focal lengths $f_1$, $f_2$ and $f_3$, respectively, and
the beam size in the top view is not affected by the ratio $f_1/f_2$.

5. An apparatus as in claim 1, wherein
the first, second and third lenses cause the input light to be focused inside the angular dispersive device at a focused position, the input light having a corresponding beam size at the focused position in the top view,
the first, second and third lenses have focal lengths $f_1$, $f_2$ and $f_3$, respectively, and
focal length $f_3$ is of a length which causes the beam size in the top view to be greater than or equal to 3 mm.

6. An apparatus as in claim 1, wherein the first, second and third lenses cause the input light to be line focused between the first and second surfaces of the angular dispersive device.

7. An apparatus as in claim 1, wherein the input light is a wavelength division multiplexed light comprising at least two carriers which each are at a different wavelength within the continuous range of wavelengths, and the plurality of transmitted lights interfere with each other to produce a respective output light for each carrier of the input light, each output light being spatially distinguishable from the other output lights.

8. An apparatus as in claim 1, wherein each of the first, second and third lenses is one of the group consisting of a cylindrical lens, a semi-cylindrical lens and a one dimensional graded index lens.

9. An apparatus having a side view and a top view and receiving an input light, the apparatus comprising:
a first lens collimating the input light in the side view and having no lens effect in the top view;
a second lens receiving the input light from the first lens, the second lens focusing the input light in the side view and having no lens effect in the top view;
a third lens receiving the input light from the second lens, the third lens collimating the input light in the top view and having no lens effect in the side view, so that the input light is focused into a line; and
an angular dispersive device including first and second surfaces, the second surface having a reflectivity which causes a portion of light incident thereon to be transmitted therethrough, the first and second surfaces being positioned so that the input light from the third lens radiates from the line to be reflected a plurality of times between the first and second surfaces and thereby cause a plurality of lights to be transmitted through the second surface, the plurality of transmitted lights interfering with each other to produce an output light which is spatially distinguishable from an output light produced for an input light at a different wavelength.

10. An apparatus as in claim 9, wherein
the first, second and third lenses cause the input light to be focused inside the angular dispersive device at a focused position, the input light having a corresponding beam size at the focused position in the side view,
the first, second and third lenses have focal lengths $f_1$, $f_2$ and $f_3$, respectively, and
the beam size in the side view is determined by the ratio $f_1/f_2$.

11. An apparatus as in claim 9, wherein
the first, second and third lenses cause the input light to be focused inside the angular dispersive device at a focused position, the input light having a corresponding beam size at the focused position in the top view,
the first, second and third lenses have focal lengths $f_1$, $f_2$ and $f_3$, respectively, and
the beam size in the top view is determined by the focal length $f_3$.

12. An apparatus as in claim 9, wherein
the first, second and third lenses cause the input light to be focused inside the angular dispersive device at a focused position, the input light having a corresponding beam size at the focused position in the top view,
the first, second and third lenses have focal lengths $f_1$, $f_2$ and $f_3$, respectively, and
the beam size in the top view is not affected by the ratio $f_1/f_2$.

13. An apparatus as in claim 9, wherein
the first, second and third lenses cause the input light to be focused inside the angular dispersive device at a focused position, the input light having a corresponding beam size at the focused position in the top view,
the first, second and third lenses have focal lengths $f_1$, $f_2$ and $f_3$, respectively, and
focal length $f_3$ is of a length which causes the beam size in the top view to be greater than or equal to 3 mm.

14. An apparatus as in claim 9, wherein the first, second and third lenses cause the input light to be line focused between the first and second surfaces of the angular dispersive device.

15. An apparatus as in claim 9, wherein the input light is a wavelength division multiplexed light comprising at least two carriers which each are at a different wavelength within the continuous range of wavelengths, and the plurality of transmitted lights interfere with each other to produce a respective output light for each carrier of the input light, each output light being spatially distinguishable from the other output lights.

16. An apparatus as in claim 9, wherein each of the first, second and third lenses is one of the group consisting of a cylindrical lens, a semi-cylindrical lens and a one dimensional graded index lens.

17. An apparatus having a side view and a top view and receiving an input light at a respective wavelength within a continuous range of wavelengths, the apparatus comprising:
a first lens receiving the input light, the first lens acting as a lens in the side view and having no lens effect in the top view;
a second lens receiving the input light from the first lens, the second lens acting as a lens in the top view and having no lens effect in the side view; and
an angular dispersive device having first and second surfaces, the second surface having a reflectivity which causes a portion of light incident thereon to be transmitted therethrough, the angular dispersive device receiving the input light from the second lens, the first and second surfaces being positioned so that the input light is reflected a plurality of times between the first and second surfaces to cause a plurality of lights to be transmitted through the second surface, the plurality of transmitted lights interfering with each other to produce an output light which is spatially distinguishable from an output light produced for an input light having any other wavelength within the continuous range of wavelengths.

18. An apparatus as in claim 17, wherein the first and second lenses cause the input light to be focused inside the angular dispersive device at a focused position, the input light having a corresponding beam size at the focused position in the top view, the first and second lenses have focal lengths $f_1$ and $f_2$, respectively, and the beam size in the top view is determined by the focal length $f_2$.

19. An apparatus as in claim 17, wherein the first and second lenses cause the input light to be focused inside the angular dispersive device at a focused position, the input light having a corresponding beam size at the focused position in the top view, the first and second lenses have focal lengths $f_1$ and $f_2$, respectively, and the beam size in the top view is not affected by the focal length $f_1$.

20. An apparatus as in claim 17, wherein the first and second lenses cause the input light to be focused inside the angular dispersive device at a focused position, the input light having a corresponding beam size at the focused position in the top view, the first and second lenses have focal lengths $f_1$ and $f_2$, respectively, and focal length $f_2$ is of a length which causes the beam size in the top view to be greater than or equal to 3 mm.

21. An apparatus as in claim 17, wherein the first and second lenses cause the input light to be line focused between the first and second surfaces of the angular dispersive device.

22. An apparatus as in claim 17, wherein the input light is a wavelength division multiplexed light comprising at least two carriers which each are at a different wavelength within the continuous range of wavelengths, and the plurality of transmitted lights interfere with each other to produce a respective output light for each carrier of the input light, each output light being spatially distinguishable from the other output lights.

23. An apparatus as in claim 17, wherein each of the first and second lenses is one of the group consisting of a cylindrical lens, a semi-cylindrical lens and a one dimensional graded index lens.

24. An apparatus having a side view and a top view and receiving an input light, the apparatus comprising:

a first lens receiving the input light, the first lens acting as a lens in the side view and having no lens effect in the top view;

a second lens receiving the input light from the first lens, the second lens acting as a lens in the top view and having no lens effect in the side view, so that the input light is focused into a line; and an angular dispersive device including first and second surfaces, the second surface having a reflectivity which causes a portion of light incident thereon to be transmitted therethrough, the first and second surfaces being positioned so that the input light from the second lens radiates from the line to be reflected a plurality of times between the first and second surfaces and thereby cause a plurality of lights to be transmitted through the second surface, the plurality of transmitted lights interfering with each other to produce an output light which is spatially distinguishable from an output light produced for an input light at a different wavelength.

25. An apparatus as in claim 24, wherein the first and second lenses cause the input light to be focused inside the angular dispersive device at a focused position, the input light having a corresponding beam size at the focused position in the top view, the first and second lenses have focal lengths $f_1$ and $f_2$, respectively, and the beam size in the top view is determined by the focal length $f_2$.

26. An apparatus as in claim 24, wherein the first and second lenses cause the input light to be focused inside the angular dispersive device at a focused position, the input light having a corresponding beam size at the focused position in the top view, the first and second lenses have focal lengths $f_1$ and $f_2$, respectively, and the beam size in the top view is not affected by the focal length $f_1$.

27. An apparatus as in claim 24, wherein the first and second lenses cause the input light to be focused inside the angular dispersive device at a focused position, the input light having a corresponding beam size at the focused position in the top view, the first and second lenses have focal lengths $f_1$ and $f_2$, respectively, and focal length $f_2$ is of a length which causes the beam size in the top view to be greater than or equal to 3 mm.

28. An apparatus as in claim 24, wherein the first and second lenses cause the input light to be line focused between the first and second surfaces of the angular dispersive device.

29. An apparatus as in claim 24, wherein the input light is a wavelength division multiplexed light comprising at least two carriers which each are at a different wavelength within the continuous range of wavelengths, and the plurality of transmitted lights interfere with each other to produce a respective output light for each carrier of the input light, each output light being spatially distinguishable from the other output lights.

30. An apparatus as in claim 24, wherein each of the first and second lenses is one of the group consisting of a cylindrical lens, a semi-cylindrical lens and a one dimensional graded index lens.

31. An apparatus having a side view and a top view and receiving an input light at a respective wavelength within a continuous range of wavelengths, the apparatus comprising:

a first lens receiving the input light, the first lens focusing the input light in the side view and having no lens effect in the top view;

a second lens receiving the input light from the first lens, the second lens collimating the input light in the top view and having no lens effect in the side view, so that the input light is focused into a line; and an angular dispersive device having first and second surfaces, the second surface having a reflectivity which causes a portion of light incident thereon to be transmitted therethrough, the angular dispersive device receiving the input light from the second lens, the first and second surfaces being positioned so that the input light is reflected a plurality of times between the first and second surfaces to cause a plurality of lights to be transmitted through the second surface, the plurality of transmitted lights interfering with each other to produce an output light which is spatially distinguishable from an output light produced for an input light having any other wavelength within the continuous range of wavelengths.

32. An apparatus having a side view and a top view and receiving an input light at a respective wavelength, the apparatus comprising:

a first lens receiving the input light, the first lens focusing the input light in the side view and having no lens effect in the top view;

a second lens receiving the input light from the first lens, the second lens collimating the input light in the top view and having no lens effect in the side view, so that the input light is focused into a line; and an angular dispersive device including first and second surfaces, the second surface having a reflectivity which causes a portion of light incident thereon to be transmitted therethrough, the first and second surfaces being positioned so that the input light from the second lens radiates from the line to be reflected a plurality of times between the first and second surfaces and thereby cause a plurality of lights to be transmitted through the second surface, the plurality of transmitted lights interfering with each other to produce an output light which is spatially distinguishable from an output light produced for an input light at a different wavelength.

33. An apparatus having a side view and a top view and receiving an input light at a respective wavelength within a continuous range of wavelengths, the apparatus comprising:

a first lens collimating the input light in the side view and having no lens effect in the top view;

a second lens receiving the input light from the first lens, the second lens focusing the input light in the side view and having no lens effect in the top view;

a third lens receiving the input light from the second lens, the third lens collimating the input light in the top view and having no lens effect in the side view; and an angular dispersive device having first and second surfaces and a radiation window, the first surface allowing substantially no light to pass therethrough, the second surface having a reflectivity which causes a portion of light incident thereon to be transmitted therethrough, the angular dispersive device receiving the input light through the radiation window from the third lens, the first and second surfaces being positioned so that the input light is reflected a plurality of times between the first and second surfaces to cause a plurality of lights to be transmitted through the second surface, the plurality of transmitted lights interfering with each other to produce an output light which is spatially distinguishable from an output light produced for an input light having any other wavelength within the continuous range of wavelengths.

34. An apparatus as in claim 33, wherein the first, second and third lenses cause the input light to be focused inside the angular dispersive device at a focused position, the input light having a corresponding beam size at the focused position in the side view, the first, second and third lenses have focal lengths $f_1$, $f_2$ and $f_3$, respectively, and the beam size in the side view is determined by the ratio $f_1/f_2$.

35. An apparatus as in claim 33, wherein the first, second and third lenses cause the input light to be focused inside the angular dispersive device at a focused position, the input light having a corresponding beam size at the focused position in the top view, the first, second and third lenses have focal lengths $f_1$, $f_2$ and $f_3$, respectively, and the beam size in the top view is determined by the focal length $f_3$.

36. An apparatus as in claim 33, wherein the first, second and third lenses cause the input light to be focused inside the angular dispersive device at a focused position, the input light having a corresponding beam size at the focused position in the top view, the first, second and third lenses have focal lengths $f_1$, $f_2$ and $f_3$, respectively, and the beam size in the top view is not affected by the ratio $f_1/f_2$.

37. An apparatus as in claim 33, wherein the first, second and third lenses cause the input light to be focused inside the angular dispersive device at a focused position, the input light having a corresponding beam size at the focused position in the top view, the first, second and third lenses have focal lengths $f_1$, $f_2$ and $f_3$, respectively, and focal length $f_3$ is of a length which causes the beam size in the top view to be greater than or equal to 3 mm.

38. An apparatus as in claim 33, wherein the first, second and third lenses cause the input light to be line focused between the first and second surfaces of the angular dispersive device.

39. An apparatus as in claim 33, wherein the input light is a wavelength division multiplexed light comprising at least two carriers which each are at a different wavelength within the continuous range of wavelengths, and the plurality of transmitted lights interfere with each other to produce a respective output light for each carrier of the input light, each output light being spatially distinguishable from the other output lights.

40. An apparatus as in claim 33, wherein each of the first, second and third lenses is one of the group consisting of a cylindrical lens, a semi-cylindrical lens and a one dimensional graded index lens.

41. An apparatus as in claim 33, wherein the radiation window has substantially no reflectance.

42. An apparatus as in claim 41, wherein the radiation window is in the same plane as the first surface.

43. An apparatus as in claim 33, wherein the first surface has substantially 100% reflectance.

44. An apparatus having a side view and a top view and receiving an input light, the apparatus comprising:

a first lens collimating the input light in the side view and having no lens effect in the top view;

a second lens receiving the input light from the first lens, the second lens focusing the input light in the side view and having no lens effect in the top view;

a third lens receiving the input light from the second lens, the third lens collimating the input light in the top view and having no lens effect in the side view, so that the input light is focused into a line; and an angular dispersive device including first and second surfaces and a radiation window, the first surface allowing substantially no light to pass therethrough, the second surface having a reflectivity which causes a portion of light incident thereon to be transmitted therethrough, the first and second surfaces and the radiation window being positioned so that the input light from the third lens passes through the radiation window and then radiates from the line to be reflected a plurality of times between the first and second surfaces and thereby cause a plurality of lights to be transmitted through the second surface, the plurality of transmitted lights interfering with each other to produce an output light which is spatially distinguishable from an output light produced for an input light at a different wavelength.

45. An apparatus as in claim 44, wherein
the first, second and third lenses cause the input light to be focused inside the angular dispersive device at a focused position, the input light having a corresponding beam size at the focused position in the side view,
the first, second and third lenses have focal lengths $f_1$, $f_2$ and $f_3$, respectively, and
the beam size in the side view is determined by the ratio $f_1/f_2$.

46. An apparatus as in claim 44, wherein
the first, second and third lenses cause the input light to be focused inside the angular dispersive device at a focused position, the input light having a corresponding beam size at the focused position in the top view,
the first, second and third lenses have focal lengths $f_1$, $f_2$ and $f_3$, respectively, and
the beam size in the top view is determined by the focal length $f_3$.

47. An apparatus as in claim 44, wherein
the first, second and third lenses cause the input light to be focused inside the angular dispersive device at a focused position, the input light having a corresponding beam size at the focused position in the top view,
the first, second and third lenses have focal lengths $f_1$, $f_2$ and $f_3$, respectively, and
the beam size in the top view is not affected by the ratio $f_1/f_2$.

48. An apparatus as in claim 44, wherein
the first, second and third lenses cause the input light to be focused inside the angular dispersive device at a focused position, the input light having a corresponding beam size at the focused position in the top view,
the first, second and third lenses have focal lengths $f_1$, $f_2$ and $f_3$, respectively, and
focal length $f_3$ is of a length which causes the beam size in the top view to be greater than or equal to 3 mm.

49. An apparatus as in claim 44, wherein the first, second and third lenses cause the input light to be line focused between the first and second surfaces of the angular dispersive device.

50. An apparatus as in claim 44, wherein the input light is a wavelength division multiplexed light comprising at least two carriers which each are at a different wavelength within the continuous range of wavelengths, and the plurality of transmitted lights interfere with each other to produce a respective output light for each carrier of the input light, each output light being spatially distinguishable from the other output lights.

51. An apparatus as in claim 44, wherein each of the first, second and third lenses is one of the group consisting of a cylindrical lens, a semi-cylindrical lens and a one dimensional graded index lens.

52. An apparatus as in claim 44, wherein the radiation window has substantially no reflectance.

53. An apparatus as in claim 52, wherein the radiation window is in the same plane as the first surface.

54. An apparatus as in claim 44, wherein the first surface has substantially 100% reflectance.

55. An apparatus having a side view and a top view and receiving an input light at a respective wavelength within a continuous range of wavelengths, the apparatus comprising:
a first lens receiving the input light, the first lens acting as a lens in the side view and having no lens effect in the top view;
a second lens receiving the input light from the first lens, the second lens acting as a lens in the top view and having no lens effect in the side view; and
an angular dispersive device having first and second surfaces and a radiation window, the first surface allowing substantially no light to pass therethrough, the second surface having a reflectivity which causes a portion of light incident thereon to be transmitted therethrough, the angular dispersive device receiving the input light from the second lens through the radiation window, the first and second surfaces being positioned so that the input light is reflected a plurality of times between the first and second surfaces to cause a plurality of lights to be transmitted through the second surface, the plurality of transmitted lights interfering with each other to produce an output light which is spatially distinguishable from an output light produced for an input light having any other wavelength within the continuous range of wavelengths.

56. An apparatus as in claim 55, wherein
the first and second lenses cause the input light to be focused inside the angular dispersive device at a focused position, the input light having a corresponding beam size at the focused position in the top view,
the first and second lenses have focal lengths $f_1$ and $f_2$, respectively, and
the beam size in the top view is determined by the focal length $f_2$.

57. An apparatus as in claim 55, wherein
the first and second lenses cause the input light to be focused inside the angular dispersive device at a focused position, the input light having a corresponding beam size at the focused position in the top view,
the first and second lenses have focal lengths $f_1$ and $f_2$, respectively, and
the beam size in the top view is not affected by the focal length $f_1$.

58. An apparatus as in claim 55, wherein
the first and second lenses cause the input light to be focused inside the angular dispersive device at a focused position, the input light having a corresponding beam size at the focused position in the top view,
the first and second lenses have focal lengths $f_1$ and f2, respectively, and
focal length $f_2$ is of a length which causes the beam size in the top view to be greater than or equal to 3 mm.

59. An apparatus as in claim 55, wherein the first and second lenses cause the input light to be line focused between the first and second surfaces of the angular dispersive device.

60. An apparatus as in claim 55, wherein the input light is a wavelength division multiplexed light comprising at least two carriers which each are at a different wavelength within the continuous range of wavelengths, and the plurality of transmitted lights interfere with each other to produce a respective output light for each carrier of the input light, each output light being spatially distinguishable from the other output lights.

61. An apparatus as in claim 55, wherein each of the first and second lenses is one of the group consisting of a cylindrical lens, a semi-cylindrical lens and a one dimensional graded index lens.

62. An apparatus as in claim 55, wherein the radiation window has substantially no reflectance.

63. An apparatus as in claim 62, wherein the radiation window is in the same plane as the first surface.

64. An apparatus as in claim 55, wherein the first surface has substantially 100% reflectance.

65. An apparatus having a side view and a top view and receiving an input light, the apparatus comprising:
   a first lens receiving the input light, the first lens acting as a lens in the side view and having no lens effect in the top view;
   a second lens receiving the input light from the first lens, the second lens acting as a lens in the top view and having no lens effect in the side view, so that the input light is focused into a line; and
   an angular dispersive device including first and second surfaces and a radiation window, the first surface allowing substantially no light to pass therethrough, the second surface having a reflectivity which causes a portion of light incident thereon to be transmitted therethrough, the first and second surfaces and the radiation window being positioned so that the input light from the second lens passes through the radiation window and then radiates from the line to be reflected a plurality of times between the first and second surfaces and thereby cause a plurality of lights to be transmitted through the second surface, the plurality of transmitted lights interfering with each other to produce an output light which is spatially distinguishable from an output light produced for an input light at a different wavelength.

66. An apparatus as in claim 65, wherein
   the first and second lenses cause the input light to be focused inside the angular dispersive device at a focused position, the input light having a corresponding beam size at the focused position in the top view,
   the first and second lenses have focal lengths $f_1$ and $f_2$, respectively, and
   the beam size in the top view is determined by the focal length $f_2$.

67. An apparatus as in claim 65, wherein
   the first and second lenses cause the input light to be focused inside the angular dispersive device at a focused position, the input light having a corresponding beam size at the focused position in the top view,
   the first and second lenses have focal lengths $f_1$ and $f_2$, respectively, and
   the beam size in the top view is not affected by the focal length $f_1$.

68. An apparatus as in claim 65, wherein
   the first and second lenses cause the input light to be focused inside the angular dispersive device at a focused position, the input light having a corresponding beam size at the focused position in the top view,
   the first and second lenses have focal lengths $f_1$ and $f_2$, respectively, and
   focal length $f_2$ is of a length which causes the beam size in the top view to be greater than or equal to 3 mm.

69. An apparatus as in claim 65, wherein the first and second lenses cause the input light to be line focused between the first and second surfaces of the angular dispersive device.

70. An apparatus as in claim 65, wherein the input light is a wavelength division multiplexed light comprising at least two carriers which each are at a different wavelength within the continuous range of wavelengths, and the plurality of transmitted lights interfere with each other to produce a respective output light for each carrier of the input light, each output light being spatially distinguishable from the other output lights.

71. An apparatus as in claim 65, wherein each of the first and second lenses is one of the group consisting of a cylindrical lens, a semi-cylindrical lens and a one dimensional graded index lens.

72. An apparatus as in claim 65, wherein the radiation window has substantially no reflectance.

73. An apparatus as in claim 72, wherein the radiation window is in the same plane as the first surface.

74. An apparatus as in claim 65, wherein the first surface has substantially 100% reflectance.

75. An apparatus having a side view and a top view and receiving an input light at a respective wavelength within a continuous range of wavelengths, the apparatus comprising:
   a first lens receiving the input light, the first lens focusing the input light in the side view and having no lens effect in the top view;
   a second lens receiving the input light from the first lens, the second lens collimating the input light in the top view and having no lens effect in the side view, so that the input light is focused into a line; and
   an angular dispersive device having first and second surfaces and a radiation window, the first surface allowing substantially no light to pass therethrough, the second surface having a reflectivity which causes a portion of light incident thereon to be transmitted therethrough, the angular dispersive device receiving the input light from the second lens through the radiation window, the first and second surfaces being positioned so that the input light is reflected a plurality of times between the first and second surfaces to cause a plurality of lights to be transmitted through the second surface, the plurality of transmitted lights interfering with each other to produce an output light which is spatially distinguishable from an output light produced for an input light having any other wavelength within the continuous range of wavelengths.

76. An apparatus as in claim 75, wherein the radiation window has substantially no reflectance.

77. An apparatus as in claim 76, wherein the radiation window is in the same plane as the first surface.

78. An apparatus as in claim 75, wherein the first surface has substantially 100% reflectance.

79. An apparatus having a side view and a top view and receiving an input light at a respective wavelength, the apparatus comprising:
   a first lens receiving the input light, the first lens focusing the input light in the side view and having no lens effect in the top view;
   a second lens receiving the input light from the first lens, the second lens collimating the input light in the top view and having no lens effect in the side view, so that the input light is focused into a line; and
   an angular dispersive device including first and second surfaces and a radiation window, the first surface allowing substantially no light to pass therethrough, the second surface having a reflectivity which causes a portion of light incident thereon to be transmitted therethrough, the first and second surfaces being positioned so that the input light from the second lens travels through the radiation window and then radiates from the line to be reflected a plurality of times between the first and second surfaces and thereby cause a plurality of lights to be transmitted through the second surface, the plurality of transmitted lights interfering with each other to produce an output light which is spatially distinguishable from an output light produced for an input light at a different wavelength.

80. An apparatus as in claim 79, wherein the radiation window has substantially no reflectance.

81. An apparatus as in claim 80, wherein the radiation window is in the same plane as the first surface.

82. An apparatus as in claim 79, wherein the first surface has substantially 100% reflectance.

83. An apparatus having a side view and a top view and receiving an input light at a respective wavelength, the apparatus comprising:

a first lens system receiving the input light, the first lens focusing the input light in the side view and having no lens effect in the top view;

a second lens system receiving the input light from the first lens system, the second lens system collimating the input light in the top view and having no lens effect in the side view, so that the input light is focused into a line; and an angular dispersive device including a transparent material, first and second surfaces on opposite sides of the transparent material, and a radiation window on the same side of the transparent material as the first surface and in the same plane as the first surface, the first surface allowing substantially no light to pass therethrough, the second surface having a reflectivity which causes a portion of light incident thereon to be transmitted therethrough, the first and second surfaces and the radiation window being positioned so that the input light from the second lens travels through the radiation window and then radiates from the line to be reflected a plurality of times between the first and second surfaces and thereby cause a plurality of lights to be transmitted through the second surface, the plurality of transmitted lights interfering with each other to produce an output light which is spatially distinguishable from an output light produced for an input light at a different wavelength.

84. An apparatus as in claim 83, wherein the first surface has substantially 100% reflectance.

85. An apparatus having a side view and a top view and receiving an input light at a respective wavelength, the apparatus comprising:

a first lens system receiving the input light, the first lens focusing the input light in the side view and having no lens effect in the top view;

a second lens system receiving the input light from the first lens system, the second lens system collimating the input light in the top view and having no lens effect in the side view, so that the input light is focused into a line; and virtually imaged phased array (VIPA) generator means for receiving the line focused input light and for producing a spatially distinguishable output light in accordance with wavelength of the input light.

* * * * *

UNITED STATES PATENT AND TRADEMARK OFFICE
CERTIFICATE OF CORRECTION

PATENT NO. : 6,169,630 B1
DATED : January 2, 2001
INVENTOR(S) : Masataka Shirasaki et al.

It is certified that error appears in the above-identified patent and that said Letters Patent is hereby corrected as shown below:

Column 21,
Line 55, begin a new paragraph with "the first, second".

Column 24,
Line 50, change "f2" to -- $f_2$ --.

Signed and Sealed this

Twenty-fifth Day of September, 2001

Attest:

NICHOLAS P. GODICI
Attesting Officer    Acting Director of the United States Patent and Trademark Office